(12) United States Patent
Liu et al.

(10) Patent No.: US 12,479,390 B2
(45) Date of Patent: Nov. 25, 2025

(54) SAFETY AIRBAG DEVICE, VEHICLE SEAT AND VEHICLE

(71) Applicant: YANFENG INTERNATIONAL AUTOMOTIVE TECHNOLOGY CO., LTD., Shanghai (CN)

(72) Inventors: Chongqing Liu, Shanghai (CN); Fan Ni, Shanghai (CN); Zhijun Wan, Shanghai (CN); Wei Zhao, Shanghai (CN)

(73) Assignee: YANFENG INTERNATIONAL AUTOMOTIVE TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 18/869,241

(22) PCT Filed: Jun. 8, 2023

(86) PCT No.: PCT/CN2023/099059
§ 371 (c)(1),
(2) Date: Nov. 25, 2024

(87) PCT Pub. No.: WO2023/241443
PCT Pub. Date: Dec. 21, 2023

(65) Prior Publication Data
US 2025/0353458 A1 Nov. 20, 2025

(30) Foreign Application Priority Data

Jun. 16, 2022 (CN) .......................... 202210683485.3
Sep. 30, 2022 (CN) .......................... 202211213617.2
Mar. 31, 2023 (CN) .......................... 202320689926.0

(51) Int. Cl.
*B60R 21/18* (2006.01)
*B60R 21/207* (2006.01)
(Continued)

(52) U.S. Cl.
CPC ............ *B60R 21/18* (2013.01); *B60R 21/207* (2013.01); *B60R 21/23138* (2013.01); *B60R 2021/0048* (2013.01); *B60R 2021/23146* (2013.01)

(58) Field of Classification Search
CPC .. B60R 21/18; B60R 21/207; B60R 21/23138
See application file for complete search history.

(56) References Cited

U.S. PATENT DOCUMENTS

2005/0230945 A1* 10/2005 Watanabe ............. B60R 21/231
280/733
2017/0282834 A1 10/2017 Sugie et al.
(Continued)

FOREIGN PATENT DOCUMENTS

CN 117622040 A * 3/2024 ........... B60R 21/231
DE 102017008166 A1 4/2018
(Continued)

OTHER PUBLICATIONS

International Search Report from corresponding International Application No. PCT/CN2023/099059, mailed on Sep. 12, 2023, 4 pages with translation.

*Primary Examiner* — Faye M Fleming
(74) *Attorney, Agent, or Firm* — Tucker Ellis LLP

(57) ABSTRACT

The present disclosure relates to a safety airbag device, a vehicle seat and a vehicle. The safety airbag device includes a head airbag portion, a chest airbag portion, an airbag tensioning belt and an airbag tensioner. The head airbag portion covers at least side areas of a head of an occupant after deployment, and the head airbag portion has an asymmetric structure about a central axis of the seat, such that a first side of the head airbag portion extends at a length shorter than that extended by a second side of the head airbag portion, whereby a space for accommodating a second safety airbag device is reserved at the first side of the (Continued)

head airbag portion. One end of the chest airbag portion is connected to the first side or the second side of the head airbag portion, and the other end of the chest airbag portion is connected with the airbag tensioner via the airbag tensioning belt; during deployment, the chest airbag portion is configured to bring the airbag tensioning belt to pass over the head of the occupant and reach a position in front of the chest of the occupant, and the airbag tensioner is configured to pull the chest airbag portion to the position in front of the chest of the occupant by tensioning the airbag tensioning belt.

20 Claims, 13 Drawing Sheets

(51) Int. Cl.
*B60R 21/231* (2011.01)
*B60R 21/00* (2006.01)

(56) References Cited

U.S. PATENT DOCUMENTS

| | | | |
|---|---|---|---|
| 2018/0281727 A1* | 10/2018 | Jenny | B60R 21/231 |
| 2021/0039578 A1 | 2/2021 | Rupp et al. | |

FOREIGN PATENT DOCUMENTS

| | | | | |
|---|---|---|---|---|
| DE | 102020101621 A1 | | 7/2021 | |
| DE | 102023106465 A1 * | | 10/2023 | B60R 21/233 |
| KR | 20190126213 A | | 11/2019 | |
| KR | 20200130765 A | | 11/2020 | |
| KR | 102225420 B1 * | | 3/2021 | B60R 21/207 |
| KR | 20210065628 A | | 6/2021 | |
| WO | 2020156953 A1 | | 8/2020 | |
| WO | 2022075216 A1 | | 4/2022 | |
| WO | WO-2023282023 A1 * | | 1/2023 | B60R 21/207 |
| WO | WO-2023160859 A1 * | | 8/2023 | B60R 21/2338 |

\* cited by examiner

SAFETY AIRBAG DEVICE, VEHICLE SEAT AND VEHICLE

CROSS-REFERENCE TO RELATED APPLICATIONS

The present disclosure claims the priority right of a Chinese patent application for invention with application number of 202210683485.3, entitled "Safety Airbag Device, Vehicle Seat and Vehicle" and filed on Jun. 16, 2022, a Chinese patent application for invention with application number of 202211213617.2, entitled "Safety Airbag Device, Vehicle Seat and Vehicle" and filed on Sep. 30, 2022, and a Chinese patent application for utility model with application number of 202320689926.0, entitled "Head-Chest Airbag Protection System for Vehicle Seat" and filed on Mar. 31, 2023, the entire contents of which are incorporated herein by reference.

TECHNICAL FIELD

The present disclosure relates generally to vehicle safety systems. More particularly, the present disclosure relates to safety airbag devices, and vehicle seats and vehicles including the safety airbag devices.

BACKGROUND ART

At present, in the field of safety of a vehicle, safety airbags for the vehicle are typically arranged in a steering wheel (for example, an airbag for the driver) and in a dashboard (for example, airbags for other occupants) to protect occupants (which may include the driver and other occupants) in a process of frontal collision of the vehicle to ensure their safety. In the case of side collision, a curtain airbag mounted on a sidewall of the vehicle body and a side airbag mounted on the side of a seat that is close to the door of the vehicle have been adopted in the prior art to reduce the injury of the side collision to the occupants.

However, the above-mentioned vehicle safety techniques and products in the prior art are only designed to provide protection for the occupants sitting with upright postures on the seats or the occupants sitting on the seats with the seats being in designed positions. In practical application, if a frontal collision occurs to the vehicle in the case where the backrest of the seat is laid down and an occupant is lying half or completely on the seat in the travelling process of the vehicle, these airbags in the prior art, whether the conventional frontal airbags or the curtain airbags, cannot provide effective protection for the occupant, since the occupant is in a half-lying or completely lying state on the seat and the body of the occupant is therefore far away from the deployment area of the conventional airbags.

Meanwhile, with developments in intelligence, autonomous driving or unmanned driving technology of vehicles, it will partially or completely free the driver and other occupants in the vehicle from attention to the driving process. Therefore, the driver and other occupants in the vehicle (especially the occupant on the copilot seat) may have more potential sitting postures, which may generally be classified into, for example, three types of sitting postures, namely: 1) normal sitting posture, 2) working sitting posture, and 3) recreational sitting posture. Specifically, the normal sitting posture refers to the sitting posture when the occupant pays full attention to the driving process of the vehicle, in which the backrest of the seat is generally adjusted to the designed position of the seat, for example, the backrest of the seat leans backward by about 25 degrees at most; the working sitting posture refers to the sitting posture when the occupant does not pay attention to the driving process of the vehicle and the occupant can work or entertain in the vehicle, in which the backrest of the seat can be adjusted to lean backwards by about 45 degrees at most; and the recreational sitting posture refers to the sitting posture when the occupant pays no attention to the driving process of the vehicle at all and the occupant can close his eyes to have a rest, in which the backrest of the seat can be adjusted to lean backwards by 60 degrees or even more. However, for the above reasons, once an inevitable collision occurs to the vehicle, the existing technology or the conventional vehicle safety system may have a difficulty in protecting the occupants in the working sitting posture and the occupants in the recreational sitting posture, and they may even aggravate the injury to the occupants, because the current existing collision-safety technical solution is only developed and subjected to collision safety evaluation for the case where the occupants are in the normal sitting posture or according to the designed position of each seat. Therefore, there is an urgent demand for a solution that can reliably provide collision protection for the occupants in both the working sitting posture and the recreational sitting posture.

SUMMARY OF THE INVENTION

An object of the present disclosure is to provide a safety airbag device adapted to be mounted on a seat of a vehicle, which can at least provide collision protection for occupants in spite of use positions of the seat, and especially it can also reliably provide collision protection for the occupants in working sitting postures and for the occupants in recreational sitting postures. Within the scope of the present disclosure, the use positions of the seat include, but are not limited to, a position where a backrest of the seat is at different inclination angles, and a front-and-rear position of the seat in a longitudinal direction of the vehicle. Within the scope of the present disclosure, the term "occupant" may include a driver and other occupants besides the driver.

In a first aspect of the present disclosure, a safety airbag device is provided. The safety airbag device is adapted to be mounted on a seat of a vehicle. The safety airbag device comprises a head airbag portion, a chest airbag portion, an airbag tensioning belt and an airbag tensioner; wherein the head airbag portion covers at least side areas of a head of an occupant after deployment, and the head airbag portion has an asymmetric structure about a central axis of the seat, such that a first side of the head airbag portion extends at a length shorter than that extended by a second side of the head airbag portion, whereby a space for accommodating a second safety airbag device is reserved at the first side of the head airbag portion, wherein the first side of the head airbag portion is a side close to a door of the vehicle, and the second side of the head airbag portion is a side away from the door of the vehicle; wherein one end of the chest airbag portion is connected to one of the first side and the second side of the head airbag portion, and other end of the chest airbag portion is connected with the airbag tensioner via the airbag tensioning belt, wherein the chest airbag portion is configured to bring the airbag tensioning belt to pass over the head of the occupant and reach a position in front of a chest of the occupant during deployment, and the airbag tensioner is configured to pull the chest airbag portion to the position in front of the chest of the occupant by tensioning the airbag tensioning belt to at least protect a chest area of the occupant.

According to an embodiment of the present disclosure, the head airbag portion, after deployment, covers at least a lateral projection area of head of a 5% female dummy sitting on the seat, a lateral projection area of head of a 50% male dummy sitting on the seat, and a lateral projection area of head of a 95% male dummy sitting on the seat.

According to an embodiment of the present disclosure, the head airbag portion is disposed around an upper edge and left and right edges of the backrest of the seat, so that the head airbag portion can surround the head of the occupant from the left and right sides and from above after deployment.

According to an embodiment of the present disclosure, the second side of the head airbag portion extends from a top portion of the backrest of the seat towards a bottom portion of the backrest of the seat.

According to an embodiment of the present disclosure, when the chest airbag portion is held in front of the chest of the occupant by the airbag tensioner, the chest airbag portion extends from one of the first side and the second side of the head airbag portion towards the other of the first side and the second side of the head airbag portion at least across the central axis of the seat.

According to an embodiment of the present disclosure, when the one end of the chest airbag portion is connected to the second side of the head airbag portion, the airbag tensioner is disposed on a side of the seat close to the door of the vehicle; and when the one end of the chest airbag portion is connected to the first side of the head airbag portion, the airbag tensioner is disposed on a side of the seat away from the door of the vehicle.

According to an embodiment of the present disclosure, when the airbag tensioner is disposed on the side of the seat close to the door of the vehicle, the airbag tensioner is placed behind the backrest of the seat at a height higher than the chest of the occupant; and when the airbag tensioner is disposed on the side of the seat away from the door of the vehicle, the airbag tensioner is placed at bottom of the backrest of the seat and near an angle adjuster of the seat.

According to an embodiment of the present disclosure, in an un-used state of the safety airbag device, the chest airbag portion and the head airbag portion are rolled up or folded along a longitudinal direction into an elongated columnar compression airbag, and the airbag tensioning belt is folded in the columnar compression airbag and disposed at edges of the backrest of the seat, so that the chest airbag portion can bring the airbag tensioning belt to pass over the head of the occupant and reach the position in front of the chest of the occupant during deployment.

According to an embodiment of the present disclosure, a free length of the airbag tensioning belt is greater than a distance from a position point of the chest airbag portion within the columnar compression airbag to a position point of the airbag tensioner, so that the airbag tensioning belt has sufficient free length to pass over the head of the occupant to reach the position in front of the chest of the occupant when the chest airbag portion is deployed.

According to an embodiment of the present disclosure, the columnar compression airbag is disposed in the seat along the edges of the backrest of the seat, so that the head airbag portion and the chest airbag portion are deployed forward around the occupant from behind when deployed.

According to an embodiment of the present disclosure, the head airbag portion and/or the chest airbag portion are formed by tailoring and sewing of fabrics or formed by weaving using integral weaving technique.

According to an embodiment of the present disclosure, when the chest airbag portion is deployed, fabrics of the chest airbag portion on a side facing the occupant have an area smaller than that of fabrics on a side facing away from the occupant.

According to an embodiment of the present disclosure, the head airbag portion and the chest airbag portion are connected to each other through a connecting portion, which is configured to allow the chest airbag portion to be pivotable relative to the head airbag portion.

According to an embodiment of the present disclosure, when deployed, fabrics of the connecting portion on a side facing the occupant have an area smaller than that of fabrics on a side facing away from the occupant.

According to an embodiment of the present disclosure, the airbag tensioning belt and the chest airbag portion are connected with each other through a single-point fixing structure or a multi-point fixing structure.

According to an embodiment of the present disclosure, the airbag tensioning belt and the chest airbag portion are connected with each other through a Y-shaped fixing structure or through an intermediate connector.

According to an embodiment of the present disclosure, the airbag tensioner is configured to retrieve the airbag tensioning belt by a predetermined length, and the airbag tensioner is configured as an airbag tensioner that is hydraulically, pneumatically, electrically, magnetically and/or mechanically actuatable.

According to an embodiment of the present disclosure, each of the head airbag portion and the chest airbag portion includes a gas chamber, the gas chamber of the head airbag portion and the gas chamber of the chest airbag portion are in fluid communication with each other, and the safety airbag device has at least one gas generator for inflating the head airbag portion and the chest airbag portion to make them deployed.

According to an embodiment of the present disclosure, each of the head airbag portion and the chest airbag portion includes a gas chamber, the gas chamber of the head airbag portion and the gas chamber of the chest airbag portion are independent of each other without fluid communication, and the safety airbag device has at least two gas generators for inflating the head airbag portion and the chest airbag portion respectively to make them deployed.

According to an embodiment of the present disclosure, the safety airbag device has a controller configured to trigger the gas generator and subsequently trigger the airbag tensioner.

According to an embodiment of the present disclosure, the safety airbag device comprises at least two gas chambers configured to be in or not in fluid communication with each other, wherein at least one of the at least two gas chambers includes part of a gas chamber of the head airbag portion and part of a gas chamber of the chest airbag portion.

According to an embodiment of the present disclosure, at least one of the head airbag portion and the chest airbag portion of the safety airbag device includes at least two gas chambers configured to be in or not in fluid communication with each other.

According to an embodiment of the present disclosure, the safety airbag device is configured to still provide protection for the head and the chest of the occupant when an inclination angle of the seat is greater than or equal to 25 degrees.

According to an embodiment of the present disclosure, an upper portion edge of the chest airbag portion includes a raised contour.

According to an embodiment of the present disclosure, the raised contour is semi-circular or semi-oval.

According to an embodiment of the present disclosure, the upper portion edge of the chest airbag portion includes a contour with two sides raised and a middle portion recessed.

According to an embodiment of the present disclosure, the head airbag portion comprises a gas chamber, which is continuously communicated at least along an overhead direction.

According to an embodiment of the present disclosure, the airbag tensioning belt extends through an entire length of the chest airbag portion and is connected to an outer side of the chest airbag portion away from the occupant.

According to an embodiment of the present disclosure, the airbag tensioning belt is mounted on the outer side of the chest airbag portion away from the occupant through a plurality of buckles.

According to an embodiment of the present disclosure, the plurality of buckles are evenly distributed.

According to an embodiment of the present disclosure, the airbag tensioning belt is centrally disposed on the outer side of the chest airbag portion away from the occupant with respect to a vertical direction.

According to an embodiment of the present disclosure, the airbag tensioning belt includes a primary belt extending in a first direction, and one end of the primary belt is fixed and connected to the seat at a position where the chest airbag portion is connected with the seat.

According to an embodiment of the present disclosure, the airbag tensioning belt further comprises a secondary belt extending in a second direction, wherein one end of the secondary belt is fixed and connected to the seat at a position where the chest airbag portion is connected with the seat, and other end of the secondary belt is connected to the primary belt.

According to an embodiment of the present disclosure, the airbag tensioning belt is sewn on the outer side of the chest airbag portion.

According to an embodiment of the present disclosure, the safety airbag device includes two or more airbag tensioning belts mounted on the outer side of the chest airbag portion through buckles.

According to an embodiment of the present disclosure, the two or more airbag tensioning belts extend in parallel and are connected to one airbag tensioner.

According to an embodiment of the present disclosure, the safety airbag device includes two or more airbag tensioning belts sewn on the outer side of the chest airbag portion.

In a second aspect of the present disclosure, a safety airbag device is provided. The safety airbag device is adapted to be mounted on a seat of a vehicle. The safety airbag device comprises a head airbag portion and a chest airbag portion, wherein the head airbag portion covers at least side areas of a head of an occupant after deployment, and the head airbag portion has an asymmetric structure about a central axis of the seat, such that a first side of the head airbag portion extends at a length shorter than that extended by a second side of the head airbag portion, whereby a space for accommodating a second safety airbag device is reserved at the first side of the head airbag portion, wherein the first side of the head airbag portion is a side close to a door of the vehicle, and the second side of the head airbag portion is a side away from the door of the vehicle; and wherein one end of the chest airbag portion is connected to one of the first side and the second side of the head airbag portion, and the chest airbag portion is positioned in a position in front of a chest of the occupant after deployment to protect at least a chest area of the occupant.

In a third aspect of the present disclosure, a safety airbag device is provided. The safety airbag device is adapted to be mounted on a seat of a vehicle. The safety airbag device comprises a head airbag portion, a chest airbag portion, an airbag tensioning belt and an airbag tensioner; wherein the head airbag portion covers at least side areas of a head of an occupant after deployment and has a first side and a second side, wherein the first side of the head airbag portion is a side close to a door of the vehicle, and the second side of the head airbag portion is a side far away from the door of the vehicle; wherein one end of the chest airbag portion is connected to one of the first side and the second side of the head airbag portion, and other end of the chest airbag portion is connected with the airbag tensioner via the airbag tensioning belt, wherein the chest airbag portion is configured to bring the airbag tensioning belt to pass over the head of the occupant and reach a position in front of a chest of the occupant during deployment, and the airbag tensioner is configured to pull the chest airbag portion to the position in front of the chest of the occupant by tensioning the airbag tensioning belt to at least protect a chest area of the occupant.

In a fourth aspect of the present disclosure, a vehicle seat is provided. The vehicle seat includes at least one safety airbag device according to the present disclosure.

According to an embodiment of the present disclosure, the vehicle seat further comprises a second safety airbag device, which is a separate side airbag provided on a side of the vehicle seat close to the door of the vehicle.

In a fifth aspect of the present disclosure, a vehicle is provided. The vehicle has the vehicle seat according to the present disclosure.

According to an embodiment of the present disclosure, the vehicle includes a safety airbag control unit configured to be at least in signal connection with the safety airbag device in the vehicle seat, so that the safety airbag control unit can at least control triggering of the gas generator and/or triggering of the airbag tensioner of the safety airbag device.

It should be noted that various aspects of the present disclosure described for one embodiment can be included in other different embodiments, although they are not specifically described for the other different embodiments. In other words, all embodiments and/or features of any embodiment can be combined in any way and/or combination as long as they are not contradictory with each other.

BRIEF DESCRIPTION OF THE DRAWINGS

Various aspects of the present disclosure will be better understood after reading the following detailed description of the invention in conjunction with the accompanying drawings, in which.

DETAILED EMBODIMENTS

Figure 1:
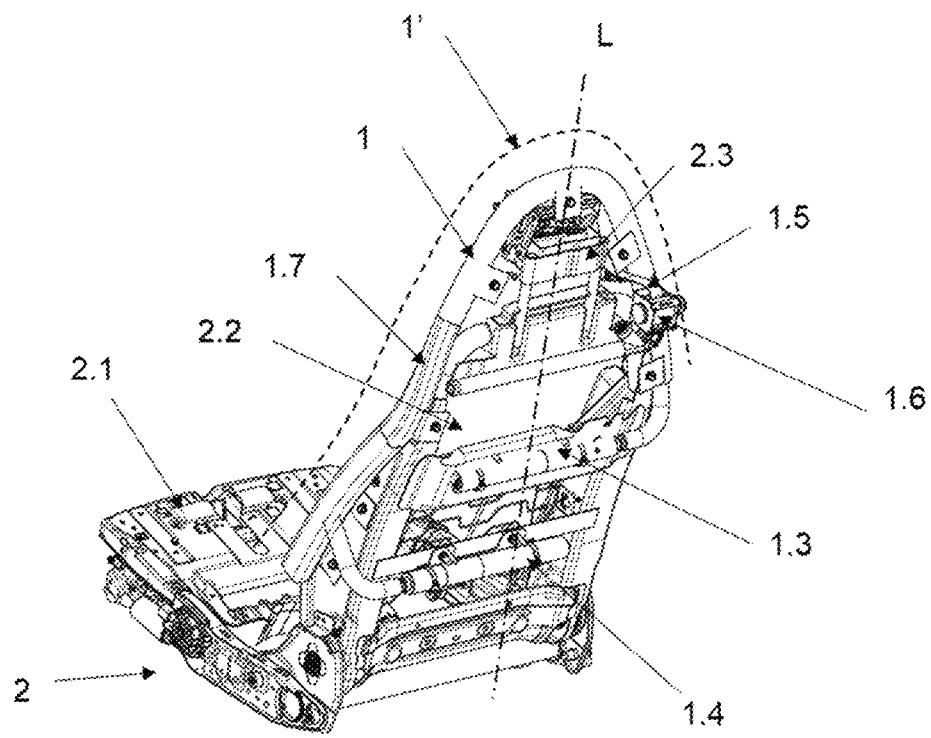
FIG. 1 is a schematic view showing a safety airbag device mounted on a seat of a vehicle according to an embodiment of the present disclosure.

The present disclosure will be described below with reference to the drawings, in which several embodiments of the present disclosure are shown. It should be understood, however, that the present disclosure may be implemented in many different ways, and is not limited to the example embodiments described below. In fact, the embodiments described hereinafter are intended to make a more complete disclosure of the present disclosure and to adequately explain the scope of the disclosure to a person skilled in the art. It should also be understood that, the embodiments disclosed herein can be combined in various ways to provide many additional embodiments.

It should be understood that, the wording in the specification is only used for describing particular embodiments and is not intended to define the present disclosure. All the terms used in the specification (including technical and scientific terms) have the meanings as normally understood by a person skilled in the art, unless otherwise defined. For the sake of conciseness and/or clarity, well-known functions or constructions may not be described in detail.

The singular forms "a/an" and "the" as used in the specification, unless clearly indicated, all contain the plural forms. The words "comprising", "containing" and "including" used in the specification indicate the presence of the claimed features, but do not preclude the presence of one or more additional features. The wording "and/or" as used in the specification includes any and all combinations of one or more of the relevant items listed.

In the specification, when an element is referred to as being "on", "attached" to, "connected" to, "coupled" with, or "contacting", etc., another element, it can be directly on, attached to, connected to, coupled with or contacting the other element or intervening elements may also be present.

In the description, the terms "first", "second", "third" and the like are used only for convenience of description and are not intended to be limiting. Any technical features represented by "first", "second", "third" and the like are interchangeable.

In the specification, words describing spatial relationships such as "up", "down", "forth", "back", "top", "bottom" and the like may describe a relation of one feature to another feature in the drawings. It should be understood that these terms also encompass different orientations of the apparatus in use or operation, in addition to encompassing the orientations shown in the drawings. For example, when the apparatus shown in the drawings is turned over, the features previously described as being "below" other features may be described to be "above" other features at this time. The apparatus may also be otherwise oriented (rotated 90 degrees or at other orientations) and the relative spatial relationships will be correspondingly altered.

The present disclosure relates to a safety airbag device. The safety airbag device according to the present disclosure is adapted to be mounted on a seat of a vehicle. The safety airbag according to the present disclosure can at least reliably provide collision protection for occupants without being affected by the use position of the seat. In particular, the safety airbag device according to the present disclosure is configured to be able to provide protection for heads and chests of the occupants even when an inclination angle of the seat is greater than or equal to 25 degrees.

FIGS. 1 to 5 show a safety airbag device 1 according to an embodiment of the present disclosure. The safety airbag device 1 may be mounted on a seat 2 of a vehicle. The safety airbag device 1 may include a head airbag portion 1.1 and a chest airbag portion 1.2. The safety airbag device 1 may further include at least one gas generator (for example, two gas generators 1.3, 1.4 shown in FIG. 1) for inflating the head airbag portion 1.1 and the chest airbag portion 1.2 to make them deployed. The head airbag portion 1.1 is configured to cover at least side areas of a head of the occupant 3 after being deployed. In an embodiment according to the present disclosure, the head airbag portion 1.1 may be configured to have an asymmetric structure with respect to a central axis L of the seat 2, such that a first side of the head airbag portion 1.1 extends at a length shorter than that extended by a second side of the head airbag portion 1.1, whereby a space for accommodating a second safety airbag device is reserved at the first side of the head airbag portion 1.1.

Referring to FIG. 1, the safety airbag device 1 mounted on the seat 2 is schematically shown. The seat 2 may be a seat for a driver and/or seats for other occupants in the vehicle. For the sake of clarity, only a seat framework 2.1 of the seat 2 is shown, while seat foaming and covering fabrics are not shown. The right side (or referred to as "a first side") of the seat in FIG. 1 may be the side close to the door of the vehicle, while the left side (or referred to as "a second side") of the seat in FIG. 1 may be the side far away from the door of the vehicle. FIG. 1 schematically shows the extending trend of the head airbag portion 1.1 on the seat 2 with dotted lines 1'. It can be seen that the head airbag portion 1.1 has an asymmetric structure with respect to the central axis L of the seat 2. The first side 1.11 (i.e., the side close to the door of the vehicle) of the head airbag portion 1.1 extends at a length shorter than that extended by the second side 1.12 (i.e., the side away from the door of the vehicle) of the head airbag portion 1.1, so as to reserve a space for accommodating a second safety airbag device, especially a separate side airbag, at the side of the head airbag portion 1.1 close to the door of the vehicle. Therefore, the first side 1.11 of the head airbag portion 1.1 may be referred to as a "short-side portion" while the second side 1.12 may be referred to as a "long-side portion". The extension length of the second side or the long-side portion of the head airbag portion 1.1 may be appropriately shortened according to the actual arrangement of interior decorations in the vehicles, so as to keep away from, for example, the central passage, the armrest of the seat, and the like. Such asymmetric structure of the head airbag portion 1.1 is advantageous in the event of a side collision, which will be described in more detail below with reference to FIGS. 2 and 3 in conjunction with the chest airbag portion 1.2.

Figure 5:
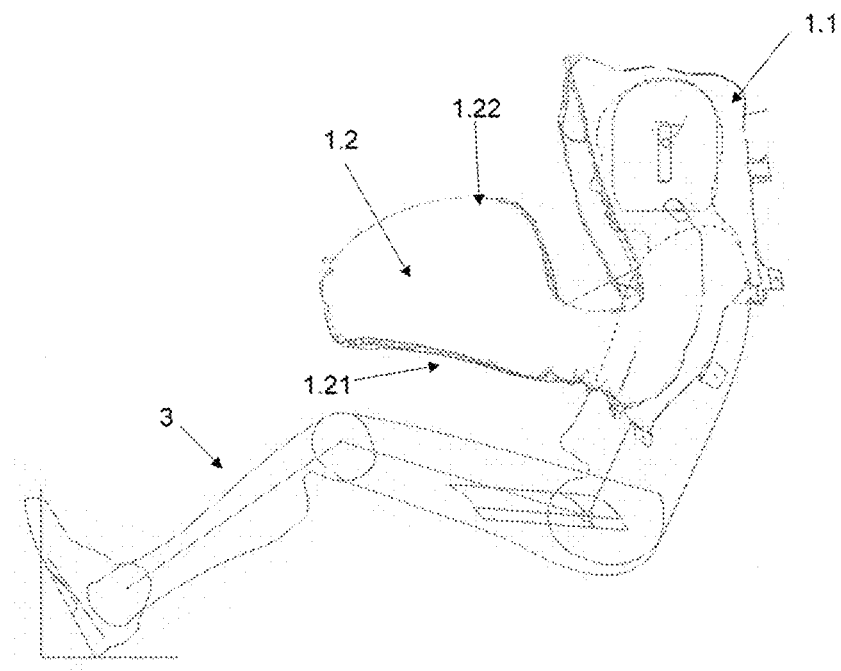
FIG. 5 is a schematic view showing side protection areas of the safety airbag device of FIG. 1.

In an embodiment according to the present disclosure, the head airbag portion 1.1 may be disposed around an upper edge and left and right edges of the seat 2 so that the head airbag portion 1.1, after deployment, can surround the head of the occupant 3 from the left and right sides and from above and at least cover side areas of the head of the occupant 3 (as shown in FIG. 5). One end of the chest airbag portion 1.2 may be connected to the second side 1.12 of the head airbag portion 1.1, and the chest airbag portion 1.2 may be configured to be able to cover and protect at least the chest of the occupant 3, and even both the chest and head-and-neck portions of the occupant 3, at a position right ahead the occupant 3 after deployment. In some cases, especially in frontal collision, after deployment of the safety airbag device 1, the chest airbag portion 1.2 may be configured to be able to cover and protect the entire area above the waist of the occupant 3 at a position right ahead the occupant 3 after deployment, thus providing more comprehensive protection for the occupant 3. As the safety airbag device 1 is mounted on the seat 2 as an entirety, an adjustment to the use position of the seat 2 (for example, the inclination angle of the backrest 2.2 of the seat 2 and the front-and-rear position of the seat 2 in the longitudinal direction of the vehicle) may not change the relative positional relationship between the safety airbag device 1 and the occupant 3 sitting on the seat 2, which enables the safety airbag device 1 to always participate in restraining the occupant 3 during the collision. Thus, the restraining and protecting functions of the safety airbag device 1 according to the present disclosure are substantially free of influence of the use position of the seat 2, and the safety airbag device 1 can provide collision protection for the occupant 3 at substantially any use position of the seat 2. In this way, the safety airbag device 1 according to the present disclosure can well protect the occupant 3, upon frontal collision and side collision, not only in the normal sitting posture of the occupant 3 (at this time, the backrest of the seat leans backward less than about 25 degrees), but also in the working sitting posture of the occupant 3 (at this time, the backrest of the seat leans backward at an angle between 25 degrees and 45 degrees), and in the recreational sitting posture of the occupant 3 (at this time, the backrest of the seat leans backward at an angle between 45 degrees and 60 degrees or even more than 60 degrees) or when the head of the occupant 3 is far away from the frontal airbag and the curtain airbag of the vehicle. Therefore, the safety airbag device 1 according to the present disclosure can be applied to vehicles with any automatic driving level.

Figure 3:
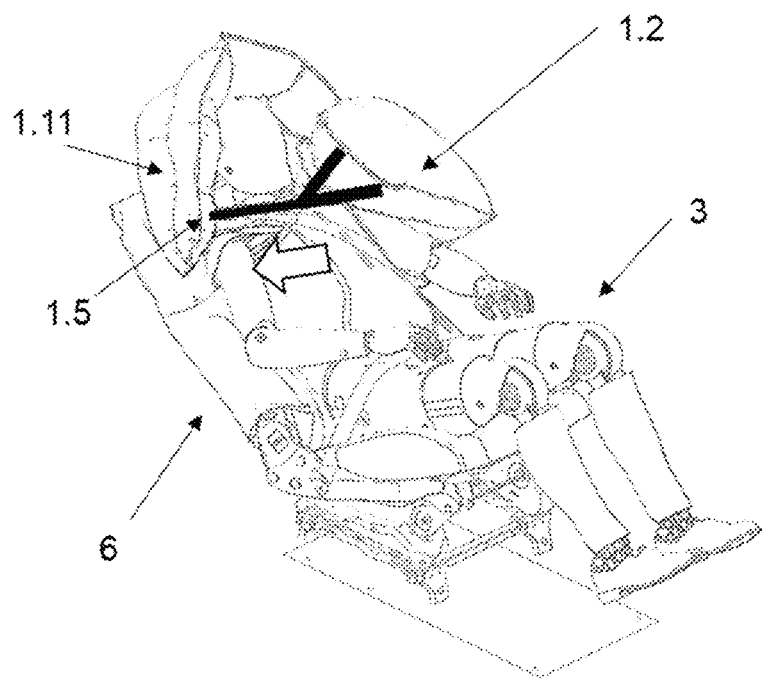
FIG. 3 is a schematic perspective view showing the safety airbag device of FIG. 2 when viewed from another side.

In an embodiment according to the present disclosure, the second side 1.12 of the head airbag portion 1.1 may extend from a top portion of the backrest 2.2 of the seat 2 (or a top portion of the headrest 2.3) to a bottom portion of the backrest 2.2 of the seat 2, while the first side 1.11 of the head airbag portion 1.1 may extend from the top portion of the backrest 2.2 of the seat 2 (or the top portion of the headrest 2.3) to a position near a shoulder portion of the occupant 3. Referring to FIG. 3, on a side of the seat 2 close to the door of the vehicle, a space 6 for accommodating a separate side airbag (not shown) is reserved below the first side 1.11 of the head airbag portion 1.1. In the event of a side collision, the second side 1.12 of the head airbag portion 1.1 together with the chest airbag portion 1.2 can wrap one arm of the occupant 3 from the side of the seat away from the door of the vehicle and can cover the chest of the occupant 3, while the side airbag on the side near the door of the vehicle can lift, when deployed, the other arm of the occupant and protect the occupant from the side near the door of the vehicle. Therefore, by constructing the head airbag portion 1.1 of the safety airbag device 1 in the present disclosure into an asymmetric structure, the safety airbag device 1 according to the present disclosure can be arranged, in combination with the separate side airbag, around the seat 2 of the vehicle to thereby provide more reliable and comprehensive protection for the occupant 3. For example, the side airbag can lift the other arm of the occupant when deployed, so as to prevent the safety airbag system of the vehicle from wrapping both arms of the occupant 3 within the airbag when deployed, and further prevent the arms from pressing the ribs of the occupant inward from both sides (which may cause additional injury risks) due to the large impact force of the airbag during deployment and the impact force during side collision. In this way, the safety airbag device 1 according to the present disclosure can avoid additional injuries to the occupant 3 as much as possible while ensuring protection for the occupant 3 regardless of the use position of the seat 2. In an embodiment according to the present disclosure, the separate side airbag may be any suitable type of side airbag in the prior art or newly developed.

In order to provide applicability as wide as possible, the head airbag portion 1.1 may be configured to cover at least a lateral projection area of a head of 5% female dummy sitting on the seat 2, a lateral projection area of a head of 50% male dummy sitting on the seat 2, and a lateral projection area of a head of 95% male dummy sitting on the seat 2 after deployment, so as to provide reliable collision protection for more than 90% occupants of different sizes and weights.

Figure 2:
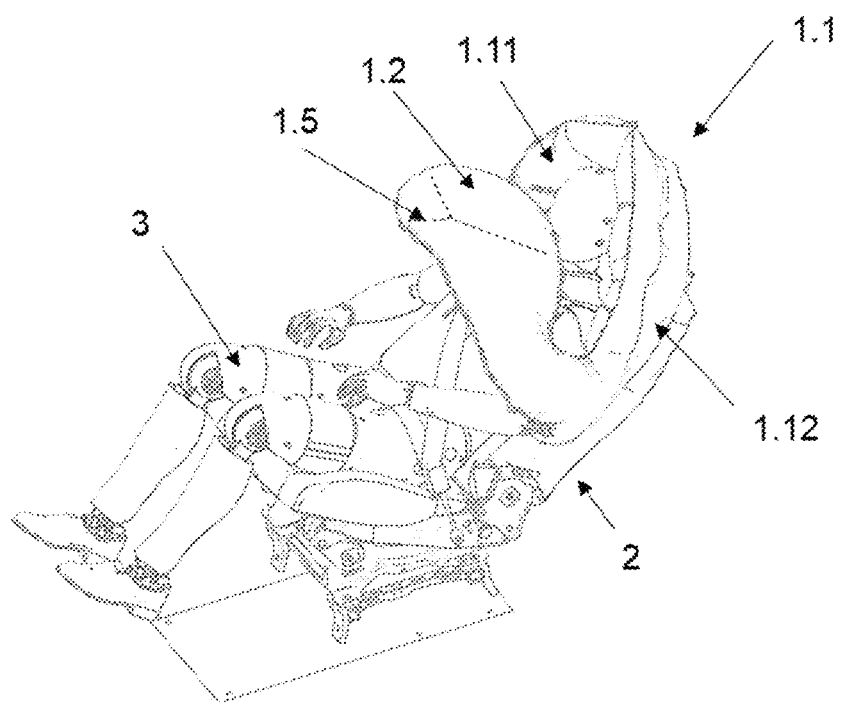
FIG. 2 is a schematic perspective view showing the safety airbag device of FIG. 1 after deployment.
Figure 4:
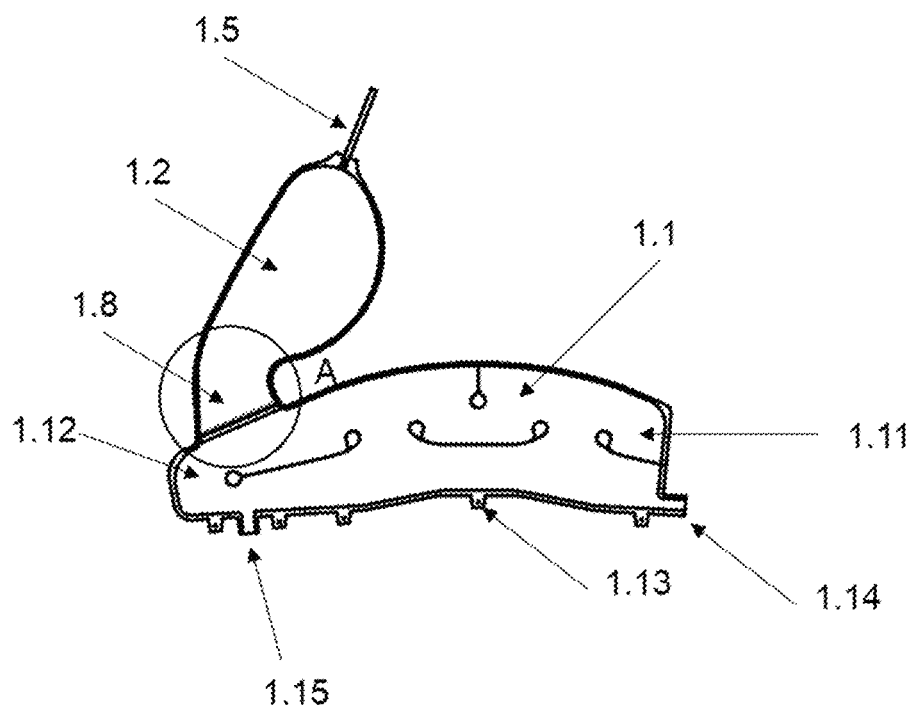
FIG. 4 is a schematic view showing a head airbag portion and a chest airbag portion of the safety airbag device of FIG. 1 before being folded.

In an embodiment according to the present disclosure, as shown in FIGS. 2 to 4, a free end of the chest airbag portion 1.2 may be connected to the airbag tensioner 1.6 through an airbag tensioning belt 1.5. As shown in FIG. 1, the airbag tensioner 1.6 may be arranged at a height higher than the chest of the occupant 3 on the side of the seat 2 close to the door of the vehicle. Specifically, the airbag tensioner 1.6 may be arranged behind the backrest 2.2 of the seat 2 at a height where the backrest 2.2 and the headrest 2.3 of the seat 2 are connected. In this way, during or after deployment, the chest airbag portion 1.2 can be pulled by the airbag tensioner 1.6 via the airbag tensioning belt 1.5 to and then held in a position in front of the chest of the occupant 3, so that in the event of collision, the chest airbag portion 1.2 can function correctly and at least protect the chest and even both the chest and head-and-neck portions of the occupant 3, or the entire area above the waist of the occupant 3.

In order to enable the chest airbag portion 1.2 to bring the airbag tensioning belt 1.5 to pass over the head of the occupant 3 and reach the position in front of the chest of the occupant 3 during deployment, in an embodiment according to the present disclosure, in an un-used state of the safety airbag device 2, the chest airbag portion 1.2 and the head airbag portion 1.1 may be rolled up or folded along a longitudinal direction into an elongated columnar compression airbag 1.7 as shown in FIG. 1. The airbag tensioning belt 1.5 is folded in the columnar compression airbag 1.7, and extends into the airbag tensioner 1.6 along edges of the backrest 2.2 and the headrest 2.3 of the seat 2 from a position point of the chest airbag portion 1.2 within the columnar compression airbag 1.7. During deployment of the chest airbag portion 1.2 and the head airbag portion 1.1, the chest airbag portion 1.2 and the head airbag portion 1.1 start from the state where they are folded or rolled up in a columnar compression airbag 1.7, break through the covering fabric of the seat 2 with deployment, and are deployed forward around the occupant 3 from behind of the occupant. Meanwhile, the chest airbag portion 1.2, during deployment, brings the airbag tensioning belt 1.5 connected therewith to pass over the head of the occupant and reach a position in front of the chest of the occupant. In order to enable the airbag tensioning belt 1.5 to smoothly bypass the head of the occupant 3 without any hindrance during deployment, in an embodiment according to the present disclosure, the airbag tensioning belt 1.5 may have a free length greater than a distance from the position point of the chest airbag portion 1.2 within the columnar compression airbag 1.7 to a position point of the airbag tensioner 1.6, so that the airbag tensioning belt 1.5 has enough free length to bypass the head of the occupant 3 and reach the position in front of the chest of the occupant 3 when the chest airbag portion 1.2 is deployed.

In order to pull the chest airbag portion 1.2 and hold it in front of the chest of the occupant 3, during or after the deployment of the chest airbag portion 1.2, the airbag tensioner 1.6 can retrieve the airbag tensioning belt 1.5 by a predetermined length in a direction indicated by the arrow in FIG. 3 to tension the chest airbag portion 1.2. In this way, in the process of collision, the head airbag portion 1.1, the chest airbag portion 1.2, the airbag tensioning belt 1.5 and the airbag tensioner 1.6 jointly produce a restraining effect on the occupant. Owing to the presence of the airbag tensioner 1.6, on one hand, the airbag tensioning belt 1.5 can smoothly bypass the head of the occupant 3 without any hindrance with a sufficient free length during the deployment of the chest airbag portion 1.2, and on the other hand, after the airbag tensioning belt 1.5 bypasses the head of the occupant 3, the airbag tensioning belt 1.5 can be actively retrieved by the airbag tensioner 1.6 to pull the chest airbag portion 1.2 and hold the chest airbag portion 1.2 tightly in front of the chest of the occupant 3, thereby producing an additional restraining effect on the occupant 3. This is particularly helpful when the inclination angle of the seat 2 is greater than or equal to 25 degrees, or when the occupant 3 is in either of the working sitting posture and the recreational sitting posture, because the seat 2 having large inclination angle may weaken the restraining and protecting effect of the safety belt of the vehicle on the occupant 3; however, these defects can be compensated by the restraining effect jointly produced on the occupant by the head airbag portion 1.1, the chest airbag portion 1.2, the airbag tensioning belt 1.5 and the airbag tensioner 1.6 according to the present disclosure. In addition, in some cases, the safety airbag device 1 according to the present disclosure can well protect and restrain the occupant 3 to some extent even in the process of violent collision or even vehicle rollover.

In order to further optimize the deployment process of the chest airbag portion 1.2 and the airbag tensioning belt 1.5, in an embodiment according to the present disclosure, the gas generators 1.3, 1.4 and the airbag tensioner 1.6 of the safety airbag device 1 may be controlled such that, upon collision, the gas generators 1.3, 1.4 are triggered first and then the airbag tensioner 1.6 is triggered. Accordingly, during deployment of the safety airbag device 1, the chest airbag portion 1.2 is at least partially deployed first, and then the airbag tensioning belt is retrieved by the airbag tensioner 1.6 to tension the chest airbag portion 1.2, thereby to guarantee a smooth deployment process.

Figure 6:
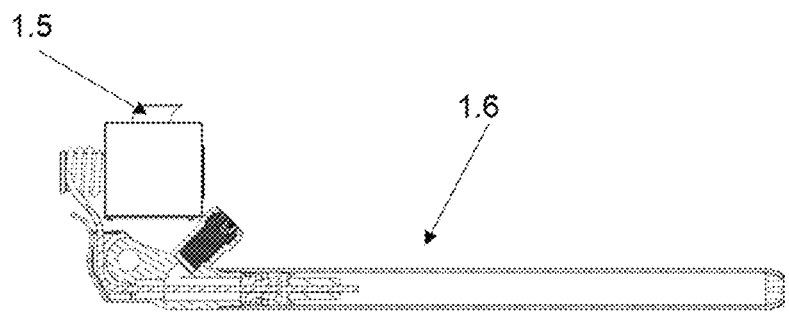
FIG. 6 is a schematic view showing an airbag tensioner of the safety airbag device before being triggered according to an embodiment of the present disclosure.
Figure 7:
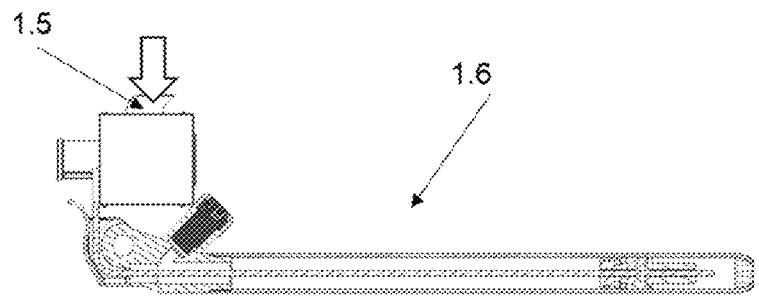
FIG. 7 is a schematic view showing the airbag tensioner of FIG. 6 after being triggered.

FIGS. 6 and 7 show the airbag tensioner 1.6 in an embodiment according to the present disclosure. The airbag tensioner 1.6 may be configured such that, after it is triggered, a pyrotechnic gas generator in the airbag tensioner 1.6 is activated to push a piston located in a steel pipe of the airbag tensioner 1.6 to move from the left position in FIG. 6 to the right position in FIG. 7, thereby driving the airbag tensioning belt 1.5 to be retrieved in a direction indicated by the arrow in FIG. 7. In some other embodiments according to the present disclosure, the airbag tensioner 1.6 may also be configured as any type of airbag tensioner that can be actuated hydraulically, pneumatically, electrically, magnetically and/or mechanically, as long as the airbag tensioner can retrieve the airbag tensioning belt 1.5 by a predetermined length.

In an embodiment according to the present disclosure, when the chest airbag portion 1.2 is held in front of the chest of the occupant 3 by the airbag tensioner 1.6, the chest airbag portion 1.2 can extend from the second side 1.12 of the head airbag portion 1.1 towards the first side 1.11 of the head airbag portion 1.2 at least across the central axis L of the seat. Thus, the chest airbag portion 1.2 can cover at least the chest, or both the chest and head-and-neck portions, or the entire area above the waist of the occupant to a great extent, thereby providing a large protection area. As shown most clearly in FIGS. 4 and 5, the chest airbag portion 1.2 may be configured to have an approximately semi-elliptical or semi-oval cross-section in a tiled (FIG. 4) or unfolded (FIG. 5) state. Seen in cross section, a lower portion 1.21 of the chest airbag portion 1.2 is substantially straight and has almost no curvature, while an upper portion 1.22 of the chest airbag portion 1.2 has a curvature. In the case where the chest airbag portion 1.2 is held in front of the chest of the occupant by the airbag tensioner 1.6, such geometrical shape of the chest airbag portion 1.2 helps to better cover and protect the chest, or both the chest and the head-and-neck portions of the occupant 3.

Figure 8:
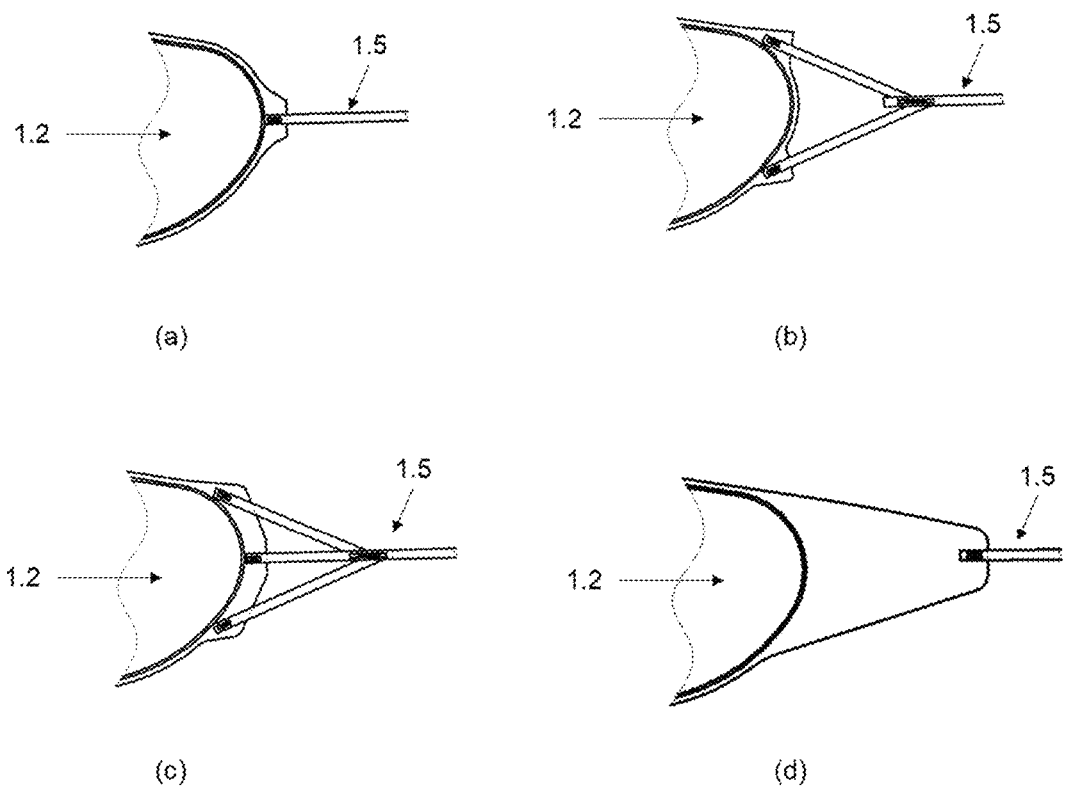
FIG. 8 is a schematic view showing different fixing structures for the chest airbag portion and the airbag tensioning belt of the safety airbag device according to the present disclosure.

In an embodiment according to the present disclosure, the airbag tensioning belt 1.5 and the chest airbag portion 1.2 may be connected to each other by a single-point fixing structure ((a) in FIG. 8). In other embodiments according to the present disclosure, the airbag tensioning belt 1.5 and the chest airbag portion 1.2 may also be connected with each other through multi-point fixing structures, such as Y-shaped fixing structures ((b) in FIG. 8), or trident fixing structures ((c) in FIG. 8). In other embodiments according to the present disclosure, the airbag tensioning belt 1.5 and the chest airbag portion 1.2 may also be connected to each other by an intermediate connector ((d) in FIG. 8). Thus, the pulling force of the airbag tensioning belt 1.5 can be distributed on the free end of the chest airbag portion 1.2 more evenly, thereby reducing the deformation of the chest airbag portion 1.2 during tensioning. The intermediate connector may be a planar connector or a three-dimensional connector in any structure.

As shown in FIG. 4, the head airbag portion 1.1 and the chest airbag portion 1.2 may be formed by tailoring and sewing of fabrics or be formed by weaving using integral weaving technique. In order to provide more favorable collision protection for the occupant 3, when the chest airbag portion 1.2 is deployed, the fabric of the chest airbag portion 1.2 on a side facing the occupant 3 may have an area smaller than that of the fabric on a side facing away from the occupant 3. In this way, the chest airbag portion 1.2, after deployment, can have such a geometric shape of naturally bending towards and surrounding the occupant 3. In an embodiment according to the present disclosure, the fabric of the chest airbag portion 1.2 on the side facing the occupant 3 can be tailored to be smaller than the fabric on the side facing away from the occupant 3, and during sewing, the fabric of the chest airbag portion 1.2 on the side facing away from the occupant 3 may be sewn in such a way that it can stretch upon deployment, thereby to obtain the above-mentioned advantageous geometrical shape of the chest airbag portion 1.2. In another embodiment according to the present disclosure, the two sides of the chest airbag portion 1.2 may be tailored to have approximately the same area, and during sewing, a portion of the fabric of the chest airbag portion 1.2 on the side facing the occupant 3 can be fixedly sewn together in an inextensible manner, thereby to obtain the above-mentioned advantageous geometrical shape of the chest airbag portion 1.2. In yet another embodiment according to the present disclosure, the chest airbag portion 1.2 may be formed by weaving using the integral weaving technique, wherein the chest airbag portion 1.2 is designed to have the above-mentioned advantageous geometrical shape.

Figure 9:
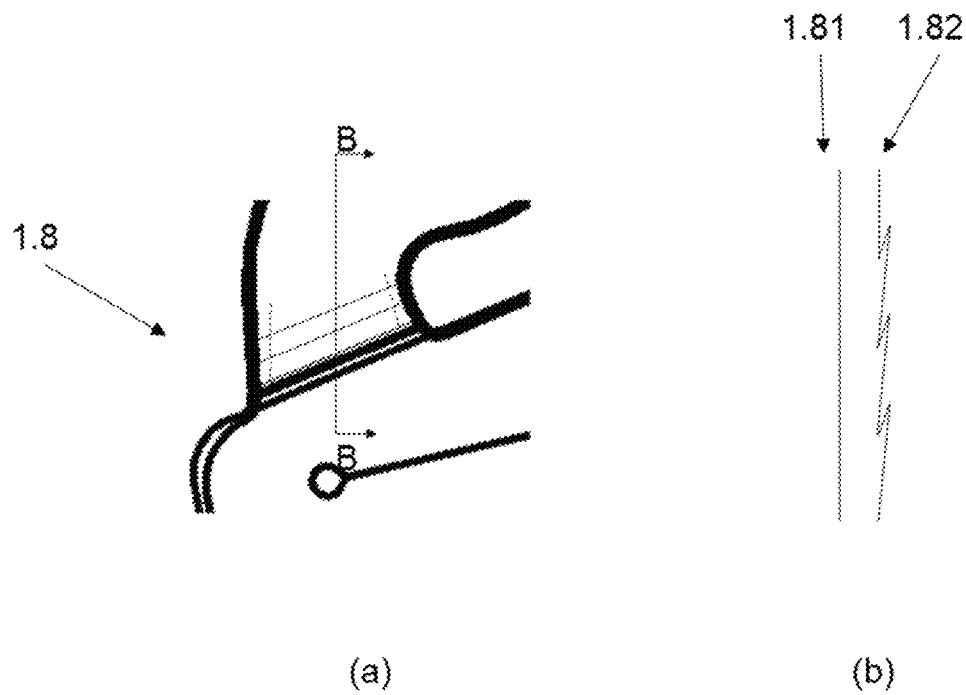
FIG. 9 is an enlarged view of part A of FIG. 4, showing a connecting portion for the head airbag portion and the chest airbag portion.

In an embodiment according to the present disclosure, the head airbag portion 1.1 and the chest airbag portion 1.2 are connected to each other through a connecting portion 1.8, which is configured such that the chest airbag portion 1.2 is pivotable relative to the head airbag portion 1.1. For this purpose, as shown in FIG. 9 (where (b) in FIG. 9 is a schematic view of the connecting portion 1.8 cut along the section line B-B in (a) of FIG. 9), the fabric 1.81 of the connecting portion 1.8 between the head airbag portion 1.1 and the chest airbag portion 1.2 on a side facing the occupant may have an area smaller than that of the fabric 1.82 on the side facing away from the occupant. The fabric 1.81 of the connecting portion 1.8 on the side facing the occupant 3 may be tailored to be smaller than the fabric 1.82 on the side facing away from the occupant, and during sewing, the fabric 1.82 of the connecting portion 1.8 on the side facing away from the occupant may be sewn, for example, in a pleated form. During deployment, the pleat of the fabric 1.82 of the connecting portion 1.8 on the side facing away from the occupant can be unfolded, so that the chest airbag portion 1.2, after deployment, can be naturally pivoted towards the occupant 3 with respect to the head airbag portion 1.1 through such geometric structure of the connecting portion 1.8. This further facilitates the chest airbag portion 1.2 to correctly and quickly reach a position where it can protect the occupant 3 after deployment.

In an embodiment according to the present disclosure, gas chambers of the head airbag portion 1.1 and the chest airbag portion 1.2 may be in fluid communication with each other, so that the safety airbag device 1 may have only one gas chamber. The two gas generators 1.3 and 1.4 disposed on the seat framework 2.1 of the seat 2 shown in FIG. 1 may be used to inflate the one gas chamber via two inflation interfaces 1.14 and 1.15 provided on the head airbag portion 1.1, respectively, to thereby deploy the head airbag portion 1.1 and the chest airbag portion 1.2. Of course, the inflation interfaces 1.14 and 1.15 may also both be arranged on the chest airbag portion 1.2, or arranged on the head airbag portion 1.1 and the chest airbag portion 1.2 respectively. In addition, the head airbag portion 1.1 and the chest airbag portion 1.2 may be connected with the seat framework 2.1 of the seat 2 through a plurality of connecting tabs 1.13 on the head airbag section 1.1, as shown in FIG. 4. For the sake of clarity, only one connecting tab is provided with a reference number. In some embodiments according to the present disclosure, the head airbag portion 1.1 and the chest airbag portion 1.2 may also be connected to the seat framework 2.1 by bonding, snap-fit connection, clamping connection, anchoring connection, or the like. In an embodiment according to the present disclosure, the gas chamber of the head airbag portion 1.1 is continuously communicated at least along the overhead direction, so that the head airbag portion is in the form of a headgear. Such head airbag portion can better wrap the head of the occupant, and can provide better restraint and protection for the occupant in accidents such as rear collision and vehicle rollover.

According to some embodiments of the present disclosure, the head airbag portion 1.1 and the chest airbag portion 1.2 may also be independent from each other without fluid communication. Accordingly, the safety airbag device 1 may include at least two gas chambers, which are inflated by at least two generators respectively, to thereby deploy the head airbag portion 1.1 and the chest airbag portion 1.2.

Figure 10:
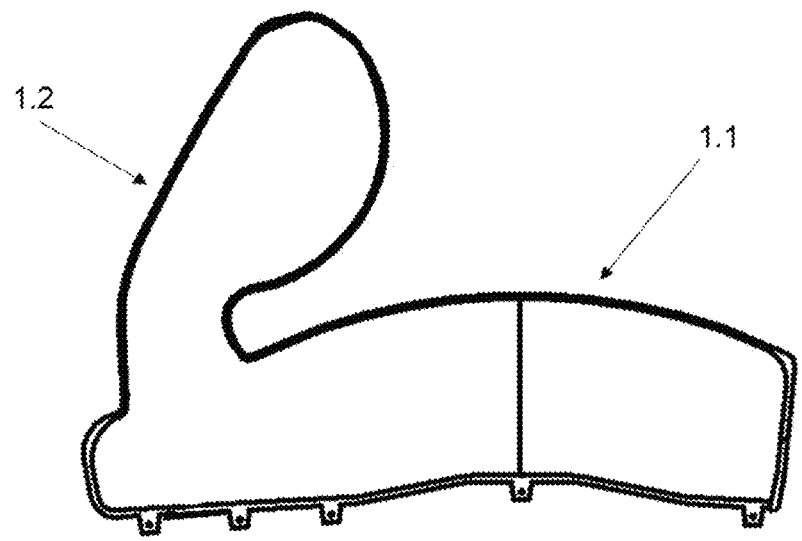
FIG. 10 is a schematic view showing a plurality of gas chambers of the safety airbag device according to an embodiment of the present disclosure.
Figure 11:
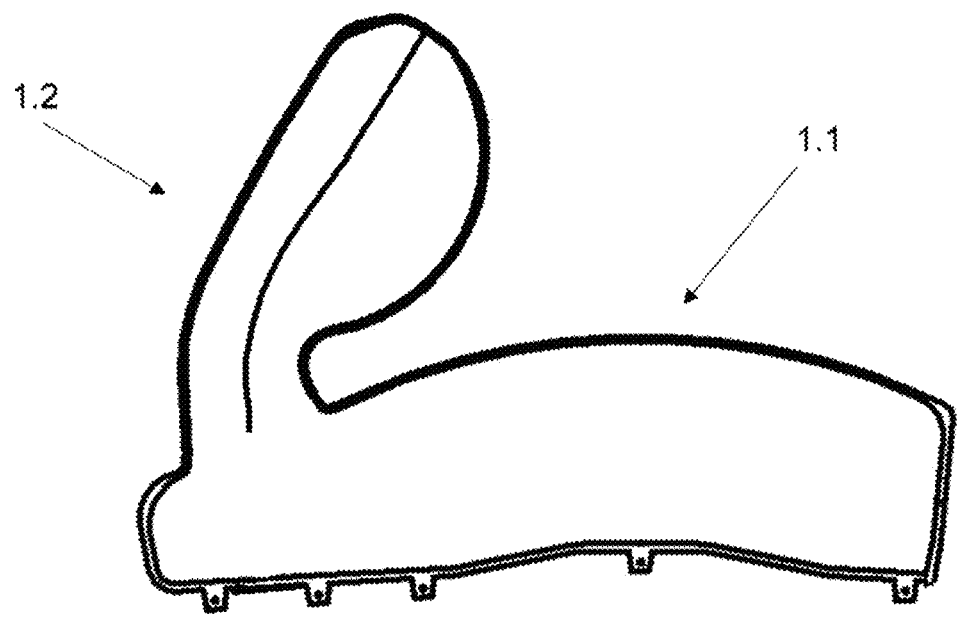
FIG. 11 is a schematic view showing a plurality of gas chambers of the safety airbag device according to another embodiment of the present disclosure.

It should be noted that the gas chamber of the safety airbag device 1 is not necessarily divided in terms of the head airbag portion 1.1 and the chest airbag portion 1.2. In some embodiments of the present disclosure, the safety airbag device 1 may include at least two gas chambers configured to be or not to be in fluid communication with each other, wherein at least one of the at least two gas chambers includes part of the gas chamber of the head airbag portion 1.1 and part of the gas chamber of the chest airbag portion 1.2. For example, in an embodiment of the present disclosure, as exemplarily shown in FIG. 10, the head airbag portion 1.1 may be divided into two gas chambers along the central axis L of the seat, wherein the second side 1.12 of the head airbag portion is in fluid communication with the gas chamber of the chest airbag portion 1.2 and constitutes a first chamber of the safety airbag device 1, while the first side 1.12 of the head airbag portion 1.1 constitutes a second chamber of the safety airbag device 1. Further, as exemplarily shown in FIG. 11, in an embodiment of the present disclosure, the head airbag section 1.1 may include only one gas chamber, while the chest airbag section 1.2 may include two gas chambers both in fluid communication with the gas chamber 1.2 of the head airbag section 1.1. In some other embodiments of the present disclosure, the head airbag portion 1.1 and the chest airbag portion 1.2 may each include two or more gas chambers, which may be obtained by dividing in any direction, and which may or may not be in fluid communication with each other. In a word, the number and configuration of the gas chambers of the safety airbag device 1 and the number and configuration of the gas generators 1.3 and 1.4 may be adjusted and adapted according to actual requirements without departing from the scope of the present application.

In some embodiments according to the present disclosure, the safety airbag device 1 may be mounted on at least one seat 2 of the vehicle, in particular, on all seats 2 of the vehicle. In some embodiments according to the present disclosure, the vehicle may include a safety airbag control unit. The safety airbag control unit may be configured to be in signal connection with at least the safety airbag device in the seat of the vehicle, so that the safety airbag control unit can at least control the triggering of the gas generator and/or the triggering of the airbag tensioner of the safety airbag device. In some embodiments according to the present disclosure, in the case that the vehicle includes a side airbag, the safety airbag control unit may also be configured to be in signal connection with the side airbag, so that the safety airbag control unit can control the triggering of the gas generator for the side airbag.

Figure 12:
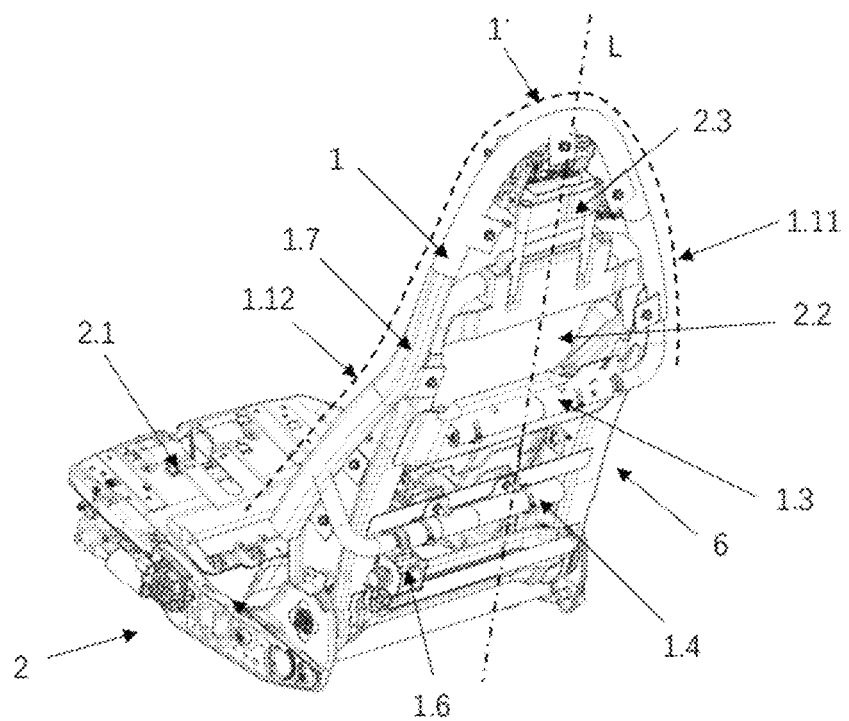
FIG. 12 is a schematic view showing a safety airbag device mounted on a seat of a vehicle according to another embodiment of the present disclosure.
Figure 13:
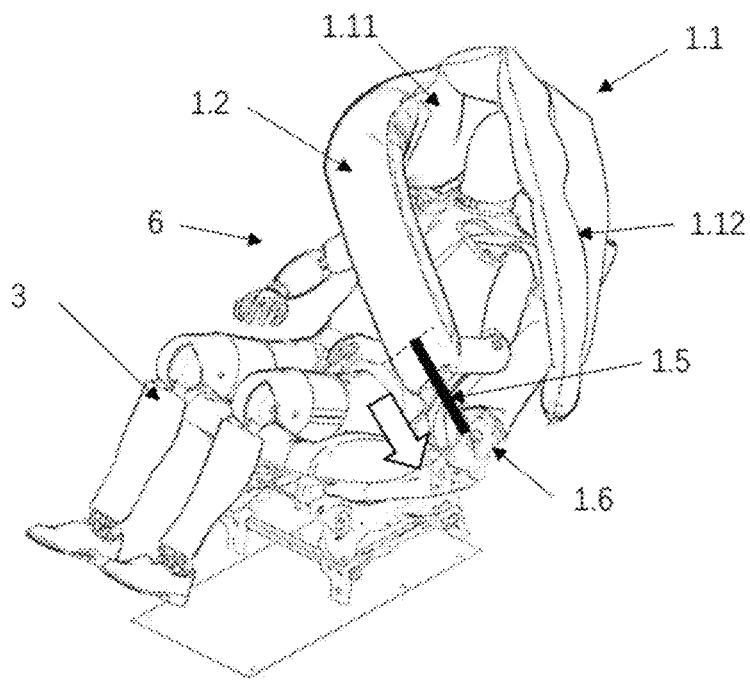
FIG. 13 is a schematic perspective view showing the safety airbag device of FIG. 12 after deployment.
Figure 14:
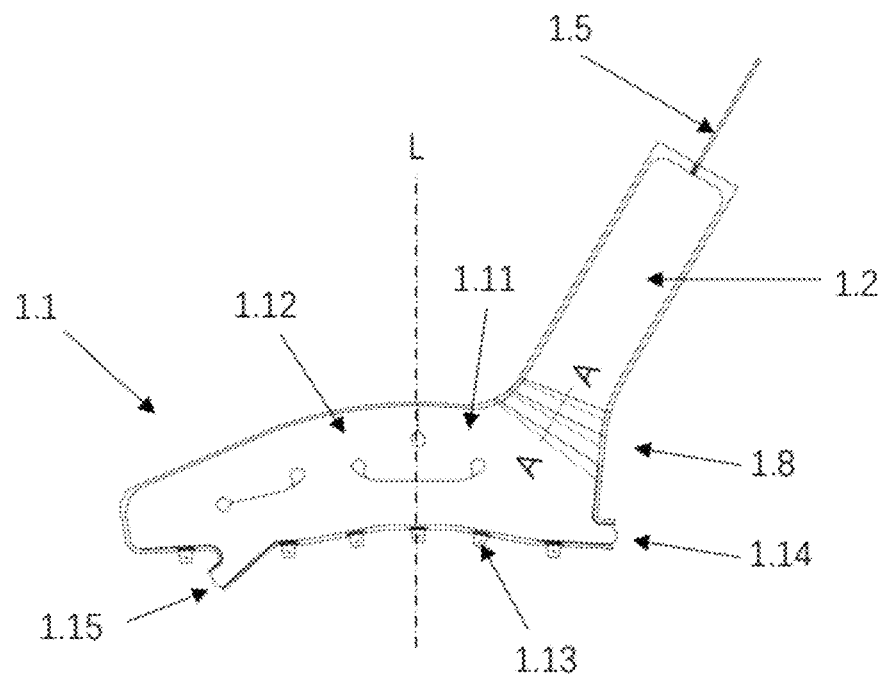
FIG. 14 is a schematic view showing a head airbag portion and a chest airbag portion of the safety airbag device of FIG. 12 before being folded.
Figure 15:
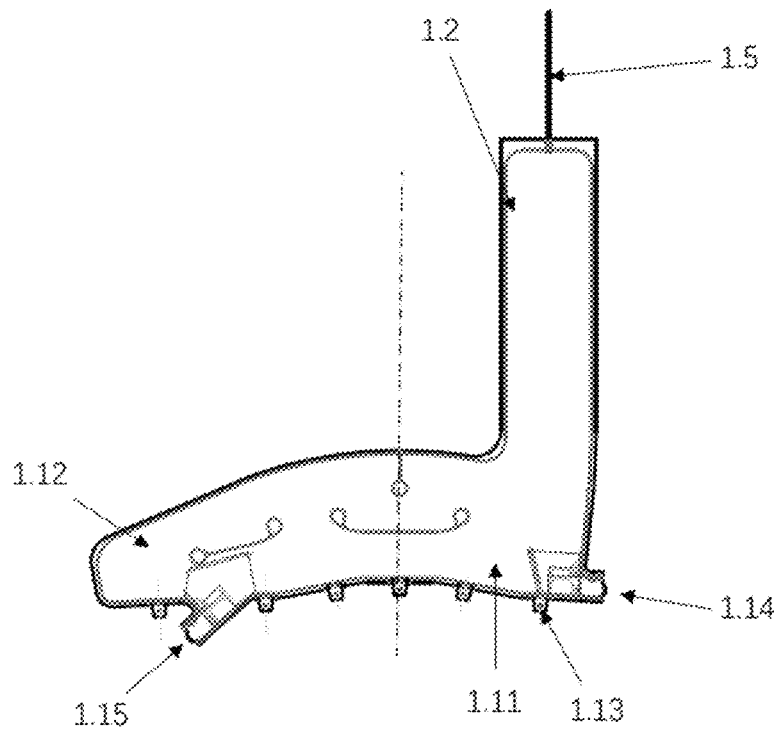
FIGS. 15 and 16 are schematic views showing the head airbag portion and the chest airbag portion of the safety airbag device before being folded according to another embodiment of the present disclosure.

Referring to FIGS. 12 to 14, the safety airbag device 1 according to another embodiment of the present disclosure is shown. The safety airbag device shown in FIGS. 12 to 14 has a substantially similar structure to the safety airbag device shown in FIGS. 1 to 5, and therefore, the same parts will not be repeated, and only the differences will be described.

As shown in FIG. 13, in this embodiment, one end of the chest airbag portion 1.2 is connected to the first side or short-side portion 1.11 of the head airbag portion 1.1 instead of being connected to the second side or long-side portion 1.12 of the head airbag portion 1.1; meanwhile, the other end (i.e., the free end) of the chest airbag portion 1.2 is connected with the airbag tensioner 1.6 via the airbag tensioning belt 1.5. In this embodiment, when the chest airbag portion 1.2 is held in front of the chest of the occupant 3 by the airbag tensioning belt 1.5 and the airbag tensioner 1.6, the chest airbag portion 1.2 may extend from the short-side portion 1.11 of the head airbag portion 1.1 towards the long-side portion 1.12 of the head airbag portion 1.2 at least across the central axis L of the seat. Thus, the chest airbag portion 1.2 can cover at least the chest of the occupant, or both the chest and head-and-neck portions of the occupant, or the entire area above the waist of the occupant to a great extent, thereby providing a large protection area. In addition, in this embodiment, when a proximal-side collision occurs (i.e., when the collision occurs at the left side as shown in FIG. 13), the occupant 3 tends to move towards the collision side (i.e., towards the outside of the vehicle); the short-side portion 1.11 and the long-side portion 1.12 of the head airbag portion 1.1 can wrap the head of the occupant 3 from both sides of the seat, the short-side portion 1.11 of the head airbag portion 1.1 together with the chest airbag portion 1.2 can surround the head of the occupant 3 from a side close to the door of the vehicle, and the chest airbag portion 1.2 can cover the chest and even the head-and-neck portion of the occupant 3 starting from the vicinity of the shoulder of the occupant 3. Further, when a distal-side collision occurs (i.e., when the collision occurs at the right side as shown in FIG. 13), the occupant 3 tends to move towards the collision side (i.e., towards the inside of the vehicle); after the head airbag portion of the safety airbag device is deployed, the long-side portion 1.12 of the head airbag portion (i.e., the head airbag portion in the inside direction of the vehicle) may support the head, neck and chest of the occupant and restrain their movement towards the collision direction, thereby producing a protective effect as a distal airbag.

In the embodiment shown in FIG. 13, the airbag tensioner 1.6 may be disposed at the bottom of the backrest of the seat 2 on the side of the seat 2 away from the door of the vehicle. Specifically, the airbag tensioner 1.6 may be arranged behind the backrest 2.2 of the seat 2 near an angle adjuster for the backrest 2.2 of the seat 2. In this way, the chest airbag portion 1.2, during or after deployment, can be pulled by the airbag tensioner 1.6 via the airbag tensioning belt 1.5 and advanced over the chest of the occupant to be held in front of the chest of the occupant 3 or across the area above the waist of the occupant ahead, so that in the event of collision, the chest airbag portion 1.2 can function correctly and at least protect the chest and even both the chest and head-and-neck portions of the occupant 3, or further at least partially protect the area above the waist of the occupant 3. In this embodiment, as the chest airbag portion 1.2 can extend substantially from the shoulder of the occupant 3 on a side close to the door of the vehicle, across the body of the occupant 3, and to the waist of the occupant 3 on the other side under the combined action of the airbag tensioning belt 1.5 and the airbag tensioner 1.6, to some extent, the safety airbag device 1 according to this embodiment can also be used in place of the safety belt or it can be attached to the safety belt. Even in a special application situation where the occupant 3 is not wearing a safety belt, the safety airbag device 1 according to the present disclosure can also function to restrain the occupant to some extent in the event of a collision.

FIGS. 14, 15-17 and 19 are schematic views respectively showing the head airbag portion 1.1 and the chest airbag portion 1.2 of the safety airbag device 1 before being folded according to different embodiments of the present disclosure. Here, the head airbag portion 1.1 and the chest airbag portion 1.2 shown in FIGS. 14, 15 and 16 can substantially form the deployed state as shown in FIG. 13 after being deployed.

In an embodiment according to the present disclosure, the chest airbag portion 1.2 may be configured to have a substantially elongated or rectangular shape in a tiled state. In an embodiment according to the present disclosure, as exemplarily shown in FIG. 14, in the tiled state, the chest airbag portion 1.2 may obliquely extend from the short-side portion 1.11 of the head airbag portion 1.1 in a direction away from the central axis L of the seat. In another embodiment according to the present disclosure, as exemplarily shown in FIG. 15, in the tiled state, the chest airbag portion 1.2 may also extend from the short-side portion 1.11 of the head airbag portion 1.1 in a direction substantially parallel to the central axis L of the seat. In yet another embodiment according to the present disclosure, as exemplarily shown in FIG. 16, in the tiled state, the chest airbag portion 1.2 may also start from the short-side portion 1.11 of the head airbag portion 1.1, and extend in a direction towards the central axis L of the seat, or towards the long-side portion 1.12 of the head airbag portion 1.1 across the central axis L of the seat via the transition of the connecting portion 1.8 between the head airbag portion 1.1 and the chest airbag portion 1.2. With such a geometric structure, the chest airbag portion 1.2 can naturally extend in the direction towards the long-side portion 1.12 of the head airbag portion 1.1 after deployment, thus facilitating the chest airbag portion 1.2 to correctly and quickly reach a position where it can protect the occupant 3 after deployment. Further, the geometric structure where the chest airbag portion 1.2 is substantially parallel to the head airbag portion 1.1 in the tiled state allows the chest airbag portion 1.2 and the head airbag portion 1.1 to be more conveniently rolled up or folded together into an elongated columnar compression airbag 1.7 as shown in FIG. 12.

Figure 18:
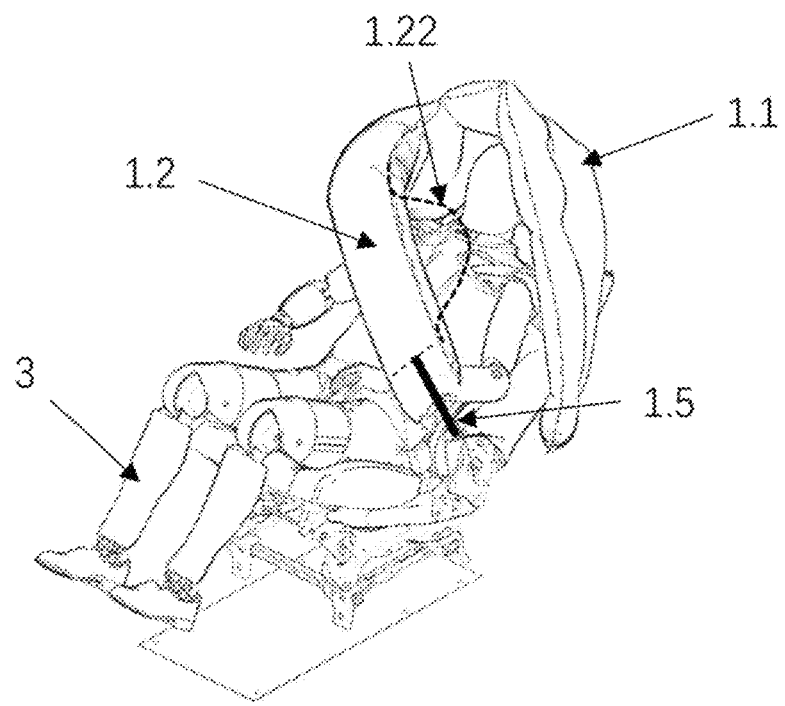
FIG. 18 is a schematic perspective view showing the safety airbag device of FIG. 17 after being deployed.
Figure 19:
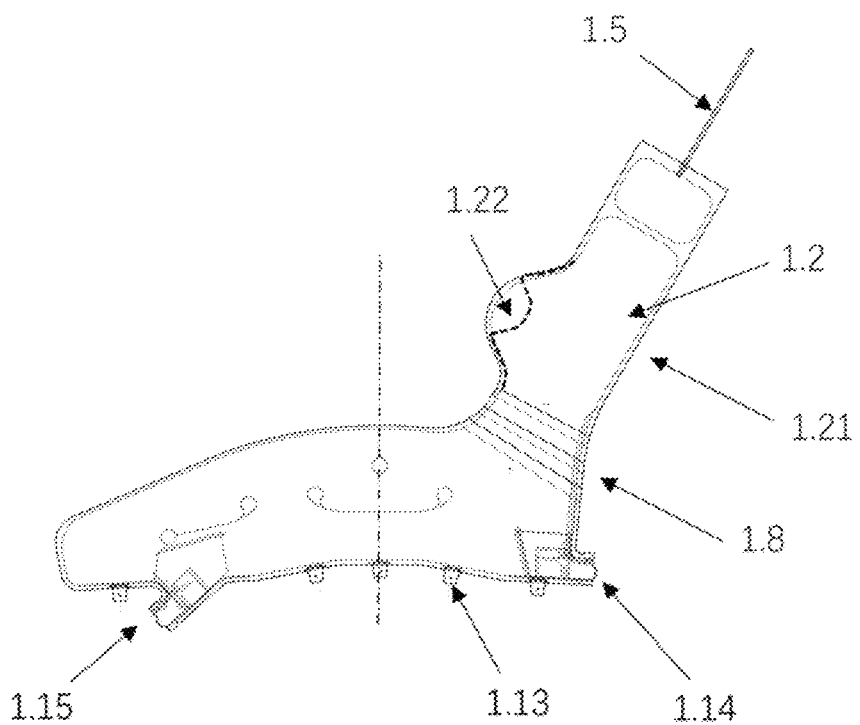
FIG. 19 is a schematic view showing the head airbag portion and the chest airbag portion of the safety airbag device before being folded according to an additional embodiment of the present disclosure.

It should be noted that the head airbag portion 1.1 and/or the chest airbag portion 1.2 may be designed into different structural forms as required without departing from the scope of the present disclosure. For example, in an embodiment according to the present disclosure, as exemplarily shown in FIGS. 17 and 18, in the tiled (FIG. 17) or deployed (FIG. 18) state, the upper portion 1.22 edge of the chest airbag portion 1.2 may include a raised contour (for example, a semicircular or semi-oval raised contour), while the lower portion 1.21 of the chest airbag portion 1.2 may be configured to be substantially straight and have almost no curvature. FIG. 18 schematically shows, with dotted lines, the trend of the upper portion 1.22 of the chest airbag portion 1.2 in the case where the chest airbag portion 1.2 is held in front of the chest of the occupant by the airbag tensioner 1.6. Here, the upper portion 1.22 of the chest airbag portion 1.2 may be appreciated as the upward longitudinal side of the chest airbag portion 1.2 in the deployed state, and correspondingly, the lower portion 1.21 of the chest airbag portion 1.2 may be appreciated as the downward longitudinal side of the chest airbag portion 1.2 in the deployed state. It can be seen that such geometrical shape of the chest airbag portion 1.2 helps to better cover and protect the chest, or both the chest and head-and-neck portions of the occupant 3. In another embodiment according to the present disclosure, the upper portion 1.22 edge of the chest airbag portion 1.2 may include a contour with both sides raised and the middle portion recessed, as shown by the dotted line in FIG. 19. In the case where the chest airbag portion 1.2 is held in front of the chest of the occupant by the airbag tensioner 1.6, such a geometric shape of the chest airbag portion 1.2 can restrain movement of the head of the occupant 3 in the lateral direction to some extent.

Figure 16:
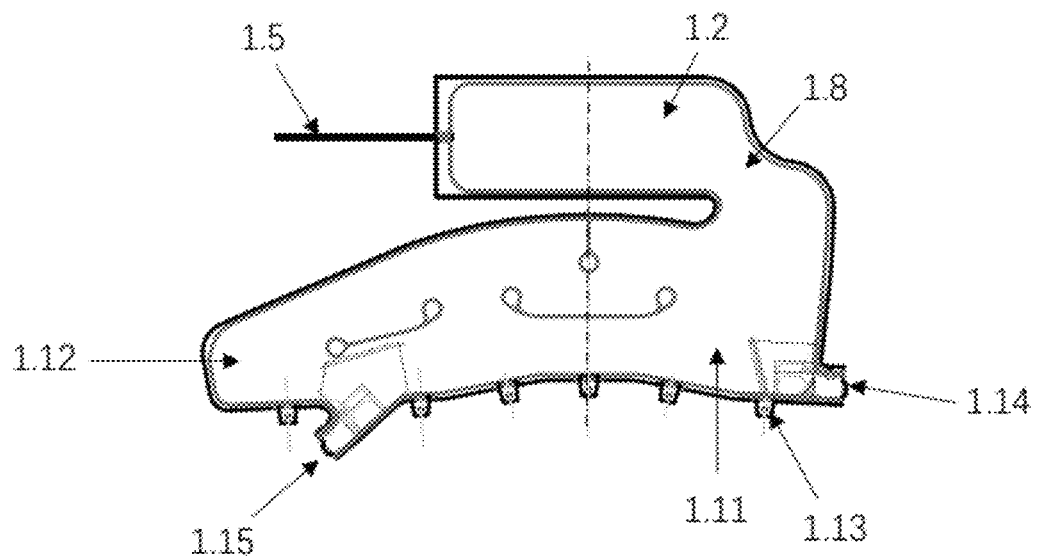
Figure 17:
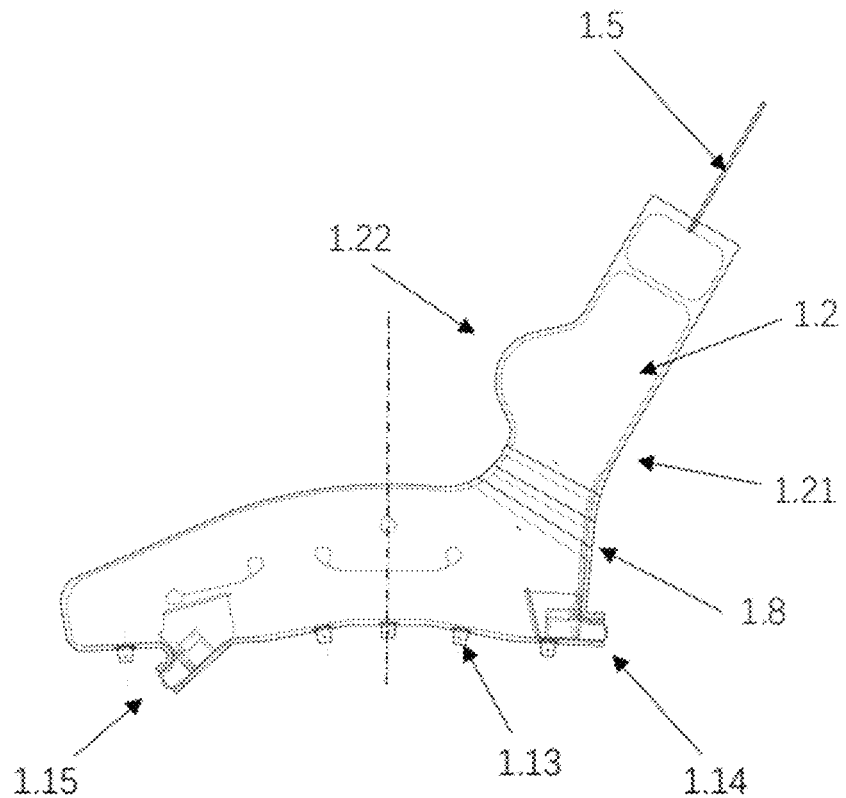
FIG. 17 is a schematic view showing the head airbag portion and the chest airbag portion of the safety airbag device before being folded according to a further embodiment of the present disclosure.
Figure 20:
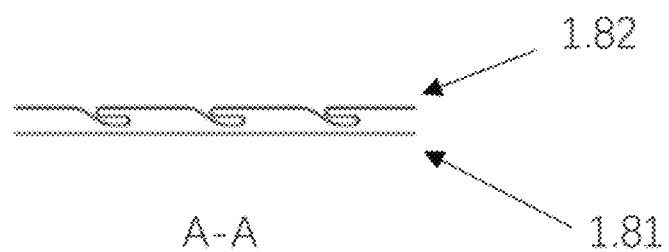
FIG. 20 is a schematic view showing the connection portion for the head airbag portion and the chest airbag portion of FIG. 14 after being cut along a cutting line A-A.

The head airbag portion 1.1 and the chest airbag portion 1.2 may be formed by tailoring and sewing of fabrics or formed by weaving using integral weaving technique. In some embodiments according to the present disclosure, the head airbag portion 1.1 and the chest airbag portion 1.2 are connected with each other by a connecting portion 1.8. Due to the flexible characteristics of the fabric material of the airbag, the connecting portion 1.8 is configured to allow the chest airbag portion 1.2 to be pivotable relative to the head airbag portion 1.1 (in particular, referring to FIGS. 14, 16, 17 and 19). In order to facilitate pivoting of the chest airbag portion 1.2 relative to the head airbag portion 1.1, in an embodiment according to the present disclosure, as shown in FIG. 16, the connecting portion 1.8 may be configured to have a small width, so that in the inflated or deployed state, a relatively small amount of gas can be filled in the connecting portion 1.8, whereby the chest airbag portion 1.2 can pivot towards the occupant 3 more easily with respect to the head airbag section 1.1. Furthermore, in an embodiment according to the present disclosure, as shown in FIG. 20 (which is a schematic view showing the connecting portion 1.8 of FIG. 14 after being cut along the cutting line A-A), the fabric 1.81 of the connecting portion 1.8 between the head airbag portion 1.1 and the chest airbag portion 1.2 on a side facing the occupant may have an area smaller than that of the fabric 1.82 on a side facing away from the occupant. The fabric 1.81 of the connecting portion 1.8 on the side facing the occupant 3 may be tailored to be smaller than the fabric 1.82 on the side facing away from the occupant, and during sewing, the fabric 1.82 of the connecting portion 1.8 on the side facing away from the occupant may be sewn, for example, in a pleated form. Upon deployment, the pleat of the fabric 1.82 of the connecting portion 1.8 on the side facing away from the occupant can be unfolded, so that the chest airbag portion 1.2 can naturally pivot towards the occupant 3 with respect to the head airbag portion 1.1 after deployment by means of such geometric structure of the connecting portion 1.8. This further facilitates the chest airbag portion 1.2 to correctly and quickly reach a position where it can protect the occupant 3 after deployment.

Figure 21:
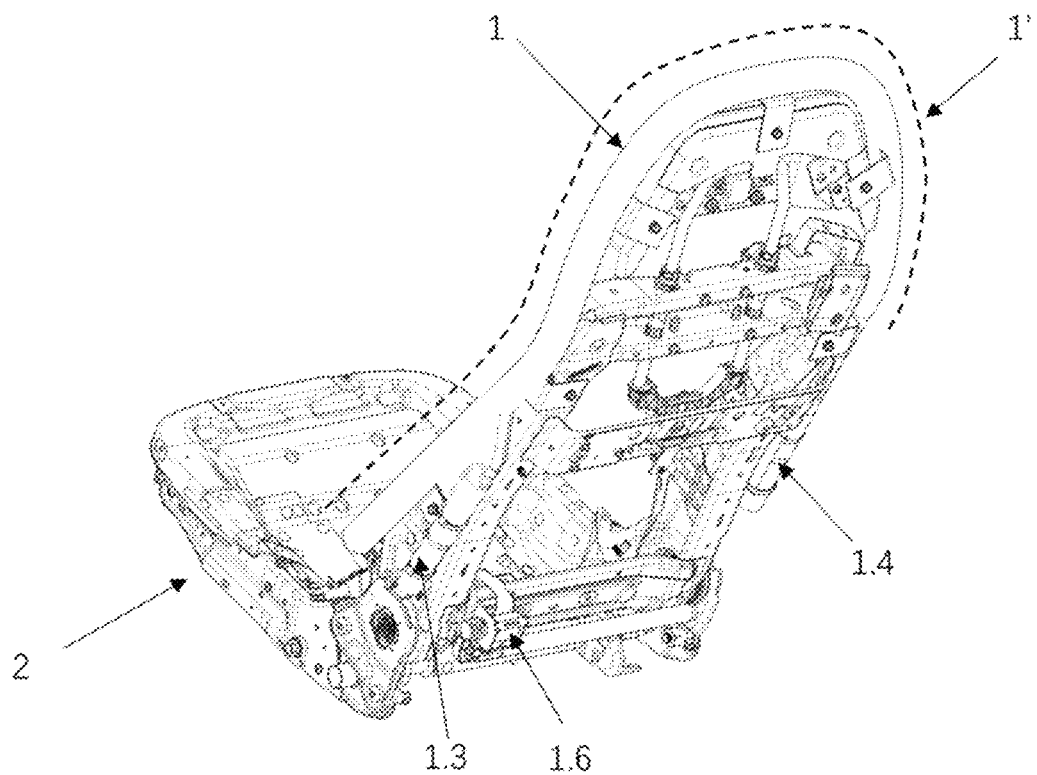
FIG. 21 is a schematic view showing a safety airbag device mounted on a seat of a vehicle according to another embodiment of the present disclosure.
Figure 22:
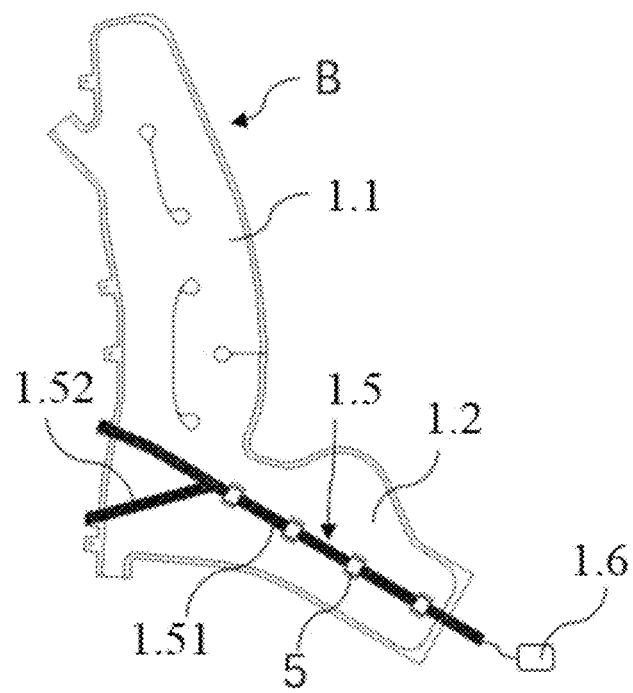
FIG. 22 is a plan top view of the safety airbag device (or "head-chest airbag protection system") according to a further embodiment of the present disclosure.
Figure 23:
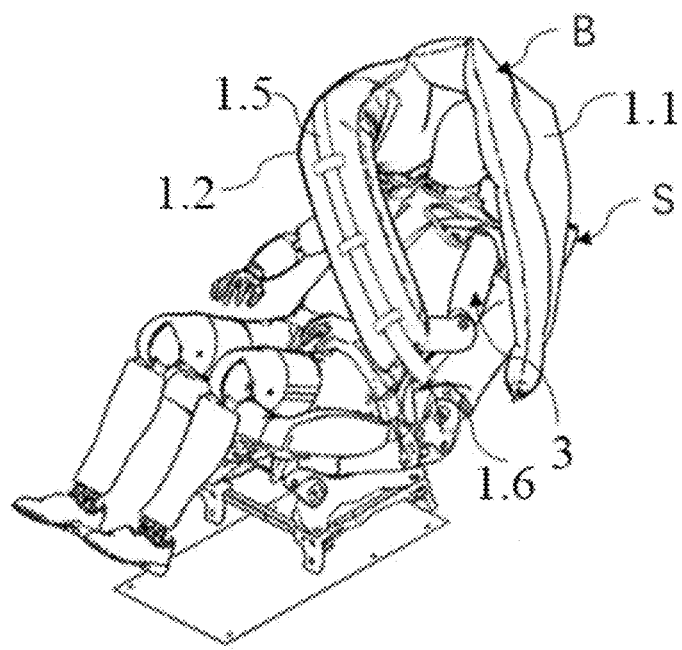
FIG. 23 is a schematic view showing the safety airbag device of FIG. 22 after being deployed on the seat.

In an embodiment according to the present disclosure, the gas generators 1.3, 1.4 may be laterally arranged on the back of the seat framework 2.1 of the seat 2, as shown in FIG. 12. In another embodiment according to the present disclosure, as exemplarily shown in FIG. 21, the gas generators 1.3, 1.4 may be vertically arranged on the back of the seat framework 2.1 of the seat 2, especially on side portions of the seat framework 2.1. Therefore, on one hand, this can reduce the requirement of the safety airbag device 1 as a whole for the structural space, and reduce the influence of the safety airbag device 1 on other members of the seat 2; on the other hand, a space can be reserved on the back of (or at the bottom of) the backrest of the seat 2 to allow, for example, the occupant sitting in the back row of the seat 2 to place his knees or legs, thus providing a more comfortable riding experience for the occupant sitting in the back row.

Next, a safety airbag device (or referred to as "a head-chest airbag protection system" B) for a seat of a vehicle according to another embodiment of the present disclosure will be described with reference to FIGS. 22 to 26, which safety airbag device is mounted on a seat S of the vehicle and includes a first airbag portion (head airbag portion) 1.1 and a second airbag portion (chest airbag portion) 1.2 in communication with each other. In this embodiment, the first airbag portion 1.1 and the second airbag portion 1.2 may be substantially L-shaped. It shall be understood that the seat here may be a seat for the driver and/or seats for other occupants in the vehicle.

The first airbag portion 1.1 may be arranged around the upper edge and the left and right edges of the seat S so that the first airbag portion 1.1, after deployment, can surround the head of the occupant 3 from the left and right sides and from above and at least cover side areas of the head of the occupant 3.

One end of the second airbag portion 1.2 is connected to the first airbag portion 1.1, and the second airbag portion 1.2 can cover and protect at least the chest and even both the chest and head-and-neck portions of the occupant 3 in a position right ahead the occupant after deployment. In some cases, especially in frontal collision, the second airbag portion 1.2 can cover and protect the entire area above the waist of the occupant in a position right ahead the occupant after deployment, thus providing more comprehensive protection for the occupant.

As the head-chest airbag protection system B is mounted on the seat S as an entirety, the adjustment to the use position of the seat S (for example, the inclination angle of the backrest) may not change the relative positional relationship between the head-chest airbag protection system B and the occupant sitting on the seat S, which enables the head-chest airbag protection system B to always participate in restraining the occupant during the collision. Therefore, the restraining and protecting function of the head-chest airbag protection system B in the present disclosure is substantially free of influence of the use position of the seat S, and this head-chest airbag protection system B can provide collision protection for the occupant almost at any use position of the seat S. That is, it can well protect the occupant, upon frontal collision and side collision, not only in the normal sitting posture (at this time, the backrest of the seat leans backward less than about 25 degrees) but also in the working sitting posture (at this time, the backrest of the seat leans backward at an angle between 25 degrees and 45 degrees) and the recreational sitting posture (at this time, the backrest of the seat leans backward at an angle between 45 degrees and 60 degrees or even more than 60 degrees) of the occupant.

The head-chest airbag protection system B further comprises an airbag tensioning belt 1.5 and an airbag tensioner 1.6, wherein the airbag tensioner 1.6 may be mounted at the bottom of the backrest of the seat (for example, near the angle adjuster), and the second airbag portion 1.2 is connected with the airbag tensioner 1.6 through the airbag tensioning belt 1.5. The second airbag portion 1.2, during or after deployment, can be pulled by the airbag tensioner 1.6 via the airbag tensioning belt 1.5 and advanced across the chest of the occupant to be held in front of the chest of the occupant 3, or it may span the area above the waist of the occupant from the front, so that in the event of collision, the second airbag portion 1.2 can function correctly and at least protect the chest of the occupant, or even both the chest and the head-and-neck portions of the occupant, or further at least partially protect the area above the waist of the occupant.

In an embodiment according to the present disclosure, the airbag tensioning belt 1.5 may extend through the entire length of the second airbag portion 1.2. In this embodiment, the airbag tensioning belt 3 may be a fabric belt. It should be understood that the fabric belt here is merely exemplary of the material rather than being restrictive. In this embodiment, the airbag tensioning belt 1.5 may be mounted on an outer side of the second airbag portion 1.2 away from the occupant through buckles 5. By connecting the airbag tensioning belt 1.5 running through the entire length to the outer side, the second airbag portion 1.2 can only bulge towards the occupant upon deployment, whereby the airbag tensioning belt 1.5 plays a restraining and supporting role, thus providing better protection for the occupant 3. In this embodiment, the airbag tensioning belt 1.5 is centrally disposed with respect to the vertical direction so as to better restrain the expansion direction of the airbag and provide corresponding support. In this embodiment, as the airbag tensioning belt 1.5 extends through the entire length of the second airbag portion 1.2 and it is by the airbag tensioning belt that the second airbag portion is restrained and supported, the airbag tensioning belt 1.5 can better restrain the expansion direction of the airbag and provide corresponding support for the airbag to protect the head, neck and chest of the driver or occupant, thereby reducing the risk of secondary collision between the driver or occupant and the interiors of the vehicle and thus reducing the injury to the driver or occupant.

Returning to FIG. 22, the airbag tensioning belt 1.5 may include a primary belt 1.51 extending in a first direction and a secondary belt 1.52 extending in a second direction, wherein the primary belt 1.51 has one end fixed and connected to the seat at a position where the second airbag portion 1.2 is connected with the seat, and the primary belt 1.51 extends in the first direction and constrained by a plurality of buckles 5; the secondary belt 1.52 has one end fixed and connected to the seat at a position where the second airbag portion 1.2 is connected with the seat, and the secondary belt 1.52 extends in the second direction and connected to the primary belt 1.51. In this embodiment, four buckles 5 are evenly distributed along the first direction, and the secondary belt 1.52 extends to the vicinity of the last buckle 5 far away from the airbag tensioner 1.6. It should be understood that the means of connection between the primary belt 1.51 and the secondary belt 1.52 here is merely exemplary rather than being restrictive. For example, it is also feasible to provide the airbag tensioning belt by only one primary belt. The airbag tensioning belt 1.5 here can provide a better tensioning effect by means of two connection points with the second airbag portion 1.2. It should be understood that the secondary belt 1.52 functions to strengthen and stabilize the tensioning of the primary belt 1.51, and the specific number of the secondary belt 1.52 may be increased or the secondary belt 1.52 may be directly canceled as required. It should be understood that the buckles 5 here are arranged in the center, that is, centrally arranged with respect to the vertical direction, so as to achieve the overall tensioning of the second airbag portion 1.2. In addition, the number of the buckles 5 is merely exemplary rather than being restrictive, and can be adjusted as required.

In this way, in the process of collision, the first airbag portion 1.1, the second airbag portion 1.2, the airbag tensioning belt 1.5 and the airbag tensioner 1.6 jointly produce a restraining effect on the occupant. Due to the presence of the airbag tensioner 1.6, on one hand, during the deployment of the second airbag portion 1.2, the airbag tensioning belt 1.5 holds the second airbag portion 1.2 in front of the chest of the occupant by means of the airbag tensioner 1.6, on the other hand, the airbag tensioning belt 1.5 restrains the airbag to lead the airbag to bulge towards the occupant, and plays a more effective supporting role in a buffering process to thereby provide protection, for example, for the head and neck of the occupant.

Figure 24:
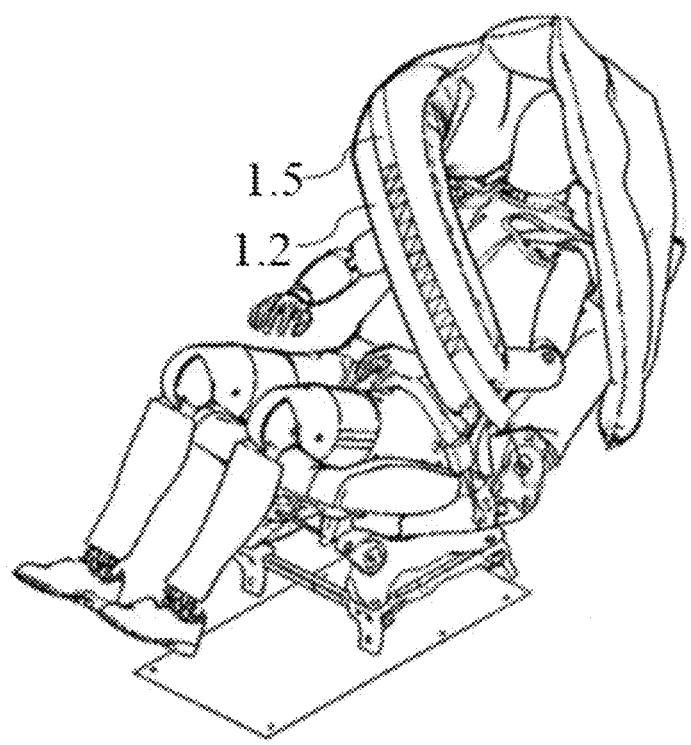
FIG. 24 is a schematic view of the safety airbag device after being deployed on the seat according to another embodiment of the present disclosure.

As shown in FIG. 24, the airbag tensioning belt 1.5 of the head-chest airbag protection system for a seat of a vehicle according to another embodiment of the present disclosure is sewn on the outer side of the second airbag portion 1.2.

Figure 25:
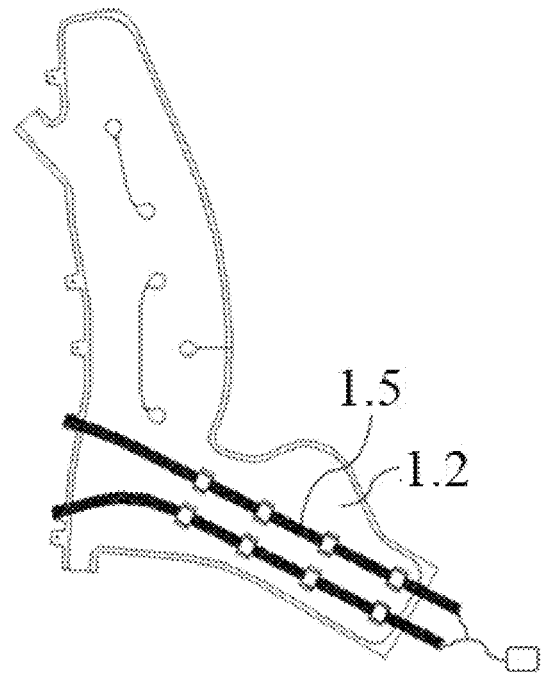
FIG. 25 is a plan top view of the safety airbag device (or "head-chest airbag protection system") according to a further embodiment of the present disclosure.

As shown in FIG. 25, the head-chest airbag protection system for a seat of a vehicle according to a further embodiment of the present disclosure includes two airbag tensioning belts 1.5 mounted on the outer side of the second airbag portion 1.2 by buckles. In this embodiment, the two airbag tensioning belts 1.5 extend approximately in parallel, with their free ends being connected to one airbag tensioner 1.6.

Figure 26:
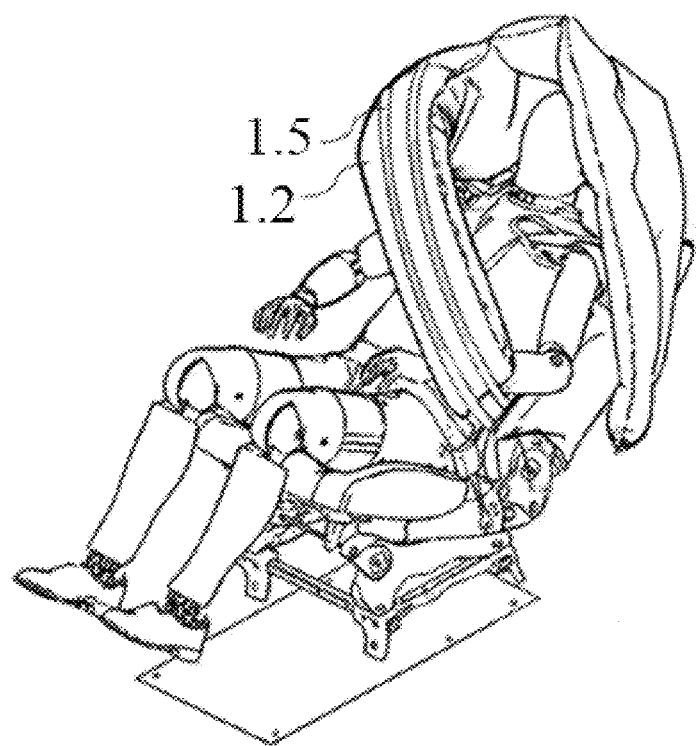
FIG. 26 is a schematic view of the safety airbag device after being deployed on the seat according to an additional embodiment of the present disclosure.

As shown in FIG. 26, the head-chest airbag protection system for a seat of a vehicle according to an additional embodiment of the present disclosure includes two airbag tensioning belts 1.5 sewn on the outer side of the second airbag portion 1.2. It should be understood that the number of the airbag tensioning belts here can be increased as required, for example, three airbag tensioning belts may be provided.

Exemplary embodiments according to the present disclosure have been described above with reference to the attached drawings. It should be understood, however, multiple changes and modifications may be made to the exemplary embodiments without substantively departing from the spirit and scope of the present disclosure. All the changes and modifications are encompassed within the protection scope of the present disclosure as defined by the claims. The present disclosure is defined by the appended claims, and equivalents of these claims are also included in the scope of the present disclosure.

What is claimed is:

1. A safety airbag device adapted to be mounted on a seat of a vehicle, wherein the safety airbag device comprises a head airbag portion, a chest airbag portion, an airbag tensioning belt and an airbag tensioner;
   wherein the head airbag portion is disposed around an upper edge and left and right edges of a backrest of the seat, so that the head airbag portion is capable of surrounding a head of the occupant from the left and right sides and from above after deployment and covers at least side areas of the head of an occupant after deployment, and the head airbag portion has an asymmetric structure about a central axis of the seat, wherein a first side of the head airbag portion extends from a top portion of the backrest of the seat to a position near a shoulder portion of the occupant, and a second side of the head airbag portion extends from the top portion of the backrest of the seat to a bottom portion of the backrest of the seat, such that the first side of the head airbag portion extends at a length shorter than that extended by the second side of the head airbag portion, whereby a space for accommodating a second safety airbag device is reserved at the first side of the head airbag portion, wherein the first side of the head airbag portion is a side close to a door of the vehicle, and the second side of the head airbag portion is a side away from the door of the vehicle; and
   wherein one end of the chest airbag portion is connected to one of the first side and the second side of the head airbag portion, and other end of the chest airbag portion is connected with the airbag tensioner via the airbag tensioning belt, when the one end of the chest airbag portion is connected to the second side of the head airbag portion, the airbag tensioner is disposed on a side of the seat close to the door of the vehicle, and when the one end of the chest airbag portion is connected to the first side of the head airbag portion, the airbag tensioner is disposed on a side of the seat away from the door of the vehicle, and wherein the chest airbag portion is configured to bring the airbag tensioning belt to pass over the head of the occupant and reach a position in front of a chest of the occupant during deployment, and the airbag tensioner is configured to pull the chest airbag portion to the position in front of the chest of the occupant by tensioning the airbag tensioning belt to at least protect a chest area of the occupant.

2. The safety airbag device according to claim 1, wherein the head airbag portion, after deployment, covers at least a lateral projection area of head of a 5% female dummy sitting on the seat, a lateral projection area of head of a 50% male dummy sitting on the seat, and a lateral projection area of head of a 95% male dummy sitting on the seat.

3. The safety airbag device according to claim 1, wherein when the chest airbag portion is held in front of the chest of the occupant by the airbag tensioner, the chest airbag portion extends from one of the first side and the second side of the head airbag portion towards the other of the first side and the second side of the head airbag portion at least across the central axis of the seat.

4. The safety airbag device according to claim 1, wherein when the airbag tensioner is disposed on the side of the seat close to the door of the vehicle, the airbag tensioner is placed behind the backrest of the seat at a height higher than the chest of the occupant; and when the airbag tensioner is disposed on the side of the seat away from the door of the vehicle, the airbag tensioner is placed at bottom of the backrest of the seat and near an angle adjuster of the seat.

5. The safety airbag device according to claim 1, wherein in an un-used state of the safety airbag device, the chest airbag portion and the head airbag portion are rolled up or folded along a longitudinal direction into an elongated columnar compression airbag, the columnar compression airbag is disposed in the seat along the edges of the backrest of the seat, so that the head airbag portion and the chest airbag portion are deployed forward around the occupant from behind when deployed; wherein and the airbag tensioning belt is folded in the columnar compression airbag and disposed at edges of the backrest of the seat, so that the chest airbag portion is capable of bringing the airbag tensioning belt to pass over the head of the occupant and reach the position in front of the chest of the occupant during deployment; and
   wherein a free length of the airbag tensioning belt is greater than a distance from a position point of the chest airbag portion within the columnar compression airbag to a position point of the airbag tensioner, so that the airbag tensioning belt has sufficient free length to pass over the head of the occupant to reach the position in front of the chest of the occupant when the chest airbag portion is deployed.

6. The safety airbag device according to claim 1, wherein the head airbag portion and/or the chest airbag portion are formed by tailoring and sewing of fabrics or formed by weaving using integral weaving technique; and
   wherein when the chest airbag portion is deployed, fabrics of the chest airbag portion on a side facing the occupant have an area smaller than that of fabrics on a side facing away from the occupant.

7. The safety airbag device according to claim 1, wherein the head airbag portion and the chest airbag portion are connected to each other through a connecting portion, which is configured to allow the chest airbag portion to be pivotable relative to the head airbag portion; and
   wherein when deployed, fabrics of the connecting portion on a side facing the occupant have an area smaller than that of fabrics on a side facing away from the occupant.

8. The safety airbag device according to claim 1, wherein the airbag tensioning belt and the chest airbag portion are connected with each other through a single-point fixing structure or a multi-point fixing structure.

9. The safety airbag device according to claim 1, wherein each of the head airbag portion and the chest airbag portion includes a gas chamber, the gas chamber of the head airbag portion and the gas chamber of the chest airbag portion are configured to be one of followings:
   1) The gas chamber of the head airbag portion and the gas chamber of the chest airbag portion are in fluid communication with each other, and the safety airbag device has at least one gas generator for inflating the head airbag portion and the chest airbag portion to make them deployed; or
   2) The gas chamber of the head airbag portion and the gas chamber of the chest airbag portion are independent of each other without fluid communication, and the safety airbag device has at least two gas generators for inflating the head airbag portion and the chest airbag portion respectively to make them deployed.

10. The safety airbag device according to claim 9, wherein the safety airbag device has a controller configured to trigger the gas generator and subsequently trigger the airbag tensioner.

11. The safety airbag device according to claim 1, wherein the safety airbag device comprises at least two gas chambers configured to be in or not in fluid communication with each other, wherein at least one of the at least two gas chambers includes part of a gas chamber of the head airbag portion and part of a gas chamber of the chest airbag portion; or
    wherein at least one of the head airbag portion and the chest airbag portion of the safety airbag device includes at least two gas chambers configured to be in or not in fluid communication with each other.

12. The safety airbag device according to claim 1, wherein the safety airbag device is configured to still provide protection for the head and the chest of the occupant when an inclination angle of the seat is greater than or equal to 25 degrees.

13. The safety airbag device according to claim 1, wherein an upper portion edge of the chest airbag portion includes a raised contour which is semi-circular or semi-oval; or
    wherein an upper portion edge of the chest airbag portion includes a contour with two sides raised and a middle portion recessed.

14. The safety airbag device according to claim 1, wherein the airbag tensioning belt extends through an entire length of the chest airbag portion, and the airbag tensioning belt is connected to an outer side of the chest airbag portion away from the occupant through a plurality of buckles or is sewn on the outer side of the chest airbag portion.

15. The safety airbag device according to claim 14, wherein the airbag tensioning belt includes a primary belt extending in a first direction, and one end of the primary belt is fixed and connected to the seat at a position where the chest airbag portion is connected with the seat and the airbag tensioning belt further comprises a secondary belt extending in a second direction, wherein one end of the secondary belt is fixed and connected to the seat at a position where the chest airbag portion is connected with the seat, and other end of the secondary belt is connected to the primary belt.

16. The safety airbag device according to claim 14, wherein the airbag tensioning belt includes two or more airbag tensioning belts that extend in parallel and are connected to one airbag tensioner.

17. A vehicle seat, wherein the vehicle seat comprises at least one safety airbag device according to claim 1.

18. The vehicle seat according to claim 17, wherein the vehicle seat further comprises a second safety airbag device, wherein the second safety airbag device is a separate side airbag provided on a side of the vehicle seat close to the door of the vehicle.

19. A vehicle, wherein the vehicle comprises the vehicle seat according to claim 17.

20. The vehicle according to claim 19, wherein the vehicle includes a safety airbag control unit configured to be at least in signal connection with the safety airbag device in the vehicle seat, so that the safety airbag control unit is capable of controlling at least triggering of the gas generators and/or triggering of the airbag tensioner of the safety airbag device.

* * * * *